United States Patent
Takahashi et al.

(10) Patent No.: US 10,206,221 B2
(45) Date of Patent: Feb. 12, 2019

(54) TERMINAL DEVICE, INTEGRATED CIRCUIT, AND WIRELESS COMMUNICATION METHOD

(71) Applicant: SHARP KABUSHIKI KAISHA, Sakai, Osaka (JP)

(72) Inventors: Hiroki Takahashi, Sakai (JP); Shoichi Suzuki, Sakai (JP); Tatsushi Aiba, Sakai (JP); Kazunari Yokomakura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 125 days.

(21) Appl. No.: 15/125,778

(22) PCT Filed: Mar. 19, 2015

(86) PCT No.: PCT/JP2015/058248
§ 371 (c)(1),
(2) Date: Sep. 13, 2016

(87) PCT Pub. No.: WO2015/141778
PCT Pub. Date: Sep. 24, 2015

(65) Prior Publication Data
US 2017/0013638 A1 Jan. 12, 2017

(30) Foreign Application Priority Data
Mar. 20, 2014 (JP) .................. 2014-058169

(51) Int. Cl.
*H04W 72/12* (2009.01)
*H04W 72/10* (2009.01)
(Continued)

(52) U.S. Cl.
CPC ....... *H04W 72/1242* (2013.01); *H04W 72/10* (2013.01); *H04W 72/1278* (2013.01);
(Continued)

(58) Field of Classification Search
None
See application file for complete search history.

(56) References Cited

U.S. PATENT DOCUMENTS

2009/0225711 A1* 9/2009 Sammour ............... H04L 47/10
370/329
2009/0316637 A1* 12/2009 Yi .......................... H04W 72/10
370/329

(Continued)

OTHER PUBLICATIONS

CATT "D2D Communication Resource Allocation Mode 1", R2-141195, 3GPP TSG RAN WG2 Meeting #85bis, Valencia, Spain, Mar. 31-Apr. 4, 2014, pp. 1-4.
(Continued)

*Primary Examiner* — Hicham B Foud
(74) *Attorney, Agent, or Firm* — Birch, Stewart, Kolasch & Birch, LLP

(57) ABSTRACT

A terminal device transmits a signal to a base station apparatus through an uplink, the terminal device including an information generator that considers a priority level for multiple MAC control elements in the logical channel prioritization procedure for the uplink, where initial transmission is performed, in which at least a first MAC control element and a second MAC control element are included in the multiple MAC control elements. The first MAC control element provides the base station apparatus with information on an amount of first data available for transmission within a first buffer for the uplink, and the second MAC control element provides the base station with information on amount of second data available for transmission within a second buffer for a first link that is used for communication between the terminal device and a different terminal device, and in which the first MAC control element has a higher priority level than the second MAC control element except when being included for padding.

15 Claims, 14 Drawing Sheets

| Index | LCID values |
|---|---|
| 00000 | CCCH |
| 00001-01010 | Identity of the logical channel |
| 01011-10111 | Reserved |
| 11000 | D2D BSR |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

(51) Int. Cl.
*H04W 80/02* (2009.01)
*H04L 29/06* (2006.01)
(52) U.S. Cl.
CPC ......... *H04W 72/1284* (2013.01); *H04L 69/12* (2013.01); *H04W 80/02* (2013.01)

(56) References Cited

U.S. PATENT DOCUMENTS

| | | | |
|---|---|---|---|
| 2013/0301568 A1* | 11/2013 | Park | H04W 52/365 |
| | | | 370/329 |
| 2014/0023010 A1* | 1/2014 | Loehr | H04W 52/365 |
| | | | 370/329 |
| 2015/0334737 A1* | 11/2015 | Susitaival | H04W 72/1284 |
| | | | 370/329 |
| 2015/0358991 A1* | 12/2015 | Park | H04W 52/0238 |
| | | | 370/336 |
| 2016/0374110 A1* | 12/2016 | Lee | H04W 4/023 |
| 2017/0019812 A1* | 1/2017 | Lee | H04W 76/14 |
| 2017/0188349 A1* | 6/2017 | Lee | H04W 72/048 |
| 2017/0238332 A1* | 8/2017 | Yi | H04W 72/10 |
| | | | 370/329 |

OTHER PUBLICATIONS

Ericsson, St-Ericsson "D2D for LTE Proximity Services: Overview", R1-132028, 3GPP TSG-RAN WG1 #73, Fukuoka, Japan, May 20-24, 2013.
LG Electronics Inc. "Prioritization handling between Legacy BSR and ProSe BSR", R2-144587, 3GPP TSG-RAN WG2 Meeting #87bis, Oct. 6-Oct. 10, 2014, Shanghai, China, pp. 1-3.

* cited by examiner

FIG. 9

| Index | Buffer Size (BS) value [bytes] | Index | Buffer Size (BS) value [bytes] |
|---|---|---|---|
| 0 | BS = 0 | 32 | 1132 < BS <= 1326 |
| 1 | 0 < BS <= 10 | 33 | 1326 < BS <= 1552 |
| 2 | 10 < BS <= 12 | 34 | 1552 < BS <= 1817 |
| 3 | 12 < BS <= 14 | 35 | 1817 < BS <= 2127 |
| 4 | 14 < BS <= 17 | 36 | 2127 < BS <= 2490 |
| 5 | 17 < BS <= 19 | 37 | 2490 < BS <= 2915 |
| 6 | 19 < BS <= 22 | 38 | 2915 < BS <= 3413 |
| 7 | 22 < BS <= 26 | 39 | 3413 < BS <= 3995 |
| 8 | 26 < BS <= 31 | 40 | 3995 < BS <= 4677 |
| 9 | 31 < BS <= 36 | 41 | 4677 < BS <= 5476 |
| 10 | 36 < BS <= 42 | 42 | 5476 < BS <= 6411 |
| 11 | 42 < BS <= 49 | 43 | 6411 < BS <= 7505 |
| 12 | 49 < BS <= 57 | 44 | 7505 < BS <= 8787 |
| 13 | 57 < BS <= 67 | 45 | 8787 < BS <= 10287 |
| 14 | 67 < BS <= 78 | 46 | 10287 < BS <= 12043 |
| 15 | 78 < BS <= 91 | 47 | 12043 < BS <= 14099 |
| 16 | 91 < BS <= 107 | 48 | 14099 < BS <= 16507 |
| 17 | 107 < BS <= 125 | 49 | 16507 < BS <= 19325 |
| 18 | 125 < BS <= 146 | 50 | 19325 < BS <= 22624 |
| 19 | 146 < BS <= 171 | 51 | 22624 < BS <= 26487 |
| 20 | 171 < BS <= 200 | 52 | 26487 < BS <= 31009 |
| 21 | 200 < BS <= 234 | 53 | 31009 < BS <= 36304 |
| 22 | 234 < BS <= 274 | 54 | 36304 < BS <= 42502 |
| 23 | 274 < BS <= 321 | 55 | 42502 < BS <= 49759 |
| 24 | 321 < BS <= 376 | 56 | 49759 < BS <= 58255 |
| 25 | 376 < BS <= 440 | 57 | 58255 < BS <= 68201 |
| 26 | 440 < BS <= 515 | 58 | 68201 < BS <= 79846 |
| 27 | 515 < BS <= 603 | 59 | 79846 < BS <= 93479 |
| 28 | 603 < BS <= 706 | 60 | 93479 < BS <= 109439 |
| 29 | 706 < BS <= 826 | 61 | 109439 < BS <= 128125 |
| 30 | 826 < BS <= 967 | 62 | 128125 < BS <= 150000 |
| 31 | 967 < BS <=1132 | 63 | BS > 150000 |

FIG. 10

| Index | Buffer Size (BS) value [bytes] | Index | Buffer Size (BS) value [bytes] |
|---|---|---|---|
| 0 | BS = 0 | 32 | 4940 < BS <= 6074 |
| 1 | 0 < BS <= 10 | 33 | 6074 < BS <= 7469 |
| 2 | 10 < BS <= 13 | 34 | 7469 < BS <= 9185 |
| 3 | 13 < BS <= 16 | 35 | 9185 < BS <= 11294 |
| 4 | 16 < BS <= 19 | 36 | 11294 < BS <= 13888 |
| 5 | 19 < BS <= 23 | 37 | 13888 < BS <= 17077 |
| 6 | 23 < BS <= 29 | 38 | 17077 < BS <= 20999 |
| 7 | 29 < BS <= 35 | 39 | 20999 < BS <= 25822 |
| 8 | 35 < BS <= 43 | 40 | 25822 < BS <= 31752 |
| 9 | 43 < BS <= 53 | 41 | 31752 < BS <= 39045 |
| 10 | 53 < BS <= 65 | 42 | 39045 < BS <= 48012 |
| 11 | 65 < BS <= 80 | 43 | 48012 < BS <= 59039 |
| 12 | 80 < BS <= 98 | 44 | 59039 < BS <= 72598 |
| 13 | 98 < BS <= 120 | 45 | 72598 < BS <= 89272 |
| 14 | 120 < BS <= 147 | 46 | 89272 < BS <= 109774 |
| 15 | 147 < BS <= 181 | 47 | 109774 < BS <= 134986 |
| 16 | 181 < BS <= 223 | 48 | 134986 < BS <= 165989 |
| 17 | 223 < BS <= 274 | 49 | 165989 < BS <= 204111 |
| 18 | 274 < BS <= 337 | 50 | 204111 < BS <= 250990 |
| 19 | 337 < BS <= 414 | 51 | 250990 < BS <= 308634 |
| 20 | 414 < BS <= 509 | 52 | 308634 < BS <= 379519 |
| 21 | 509 < BS <= 625 | 53 | 379519 < BS <= 466683 |
| 22 | 625 < BS <= 769 | 54 | 466683 < BS <= 573866 |
| 23 | 769 < BS <= 945 | 55 | 573866 < BS <= 705666 |
| 24 | 945 < BS <= 1162 | 56 | 705666 < BS <= 867737 |
| 25 | 1162 < BS <= 1429 | 57 | 867737 < BS <= 1067031 |
| 26 | 1429 < BS <= 1757 | 58 | 1067031 < BS <= 1312097 |
| 27 | 1757 < BS <= 2161 | 59 | 1312097 < BS <= 1613447 |
| 28 | 2161 < BS <= 2657 | 60 | 1613447 < BS <= 1984009 |
| 29 | 2657 < BS <= 3267 | 61 | 1984009 < BS <= 2439678 |
| 30 | 3267 < BS <= 4017 | 62 | 2439678 < BS <= 3000000 |
| 31 | 4017 < BS <= 4940 | 63 | BS > 3000000 |

FIG. 14

| Index | Buffer Size (BS) value [bytes] | Index | Buffer Size (BS) value [bytes] |
|---|---|---|---|
| 0 | BS = 0 | 32 | 1132 < BS <= 1326 |
| 1 | 0 < BS <= 10 | 33 | 1326 < BS <= 1552 |
| 2 | 10 < BS <= 12 | | |
| 3 | 12 < BS <= 14 | | |
| 4 | 14 < BS <= 17 | | |
| 5 | 17 < BS <= 19 | | |
| 6 | 19 < BS <= 22 | | |
| 7 | 22 < BS <= 26 | | |
| 8 | 26 < BS <= 31 | | |
| 9 | 31 < BS <= 36 | | |
| 10 | 36 < BS <= 42 | | |
| 11 | 42 < BS <= 49 | | |
| 12 | 49 < BS <= 57 | | |
| 13 | 57 < BS <= 67 | | |
| 14 | 67 < BS <= 78 | ... | ... |
| 15 | 78 < BS <= 91 | | |
| 16 | 91 < BS <= 107 | | |
| 17 | 107 < BS <= 125 | | |
| 18 | 125 < BS <= 146 | | |
| 19 | 146 < BS <= 171 | | |
| 20 | 171 < BS <= 200 | | |
| 21 | 200 < BS <= 234 | | |
| 22 | 234 < BS <= 274 | | |
| 23 | 274 < BS <= 321 | | |
| 24 | 321 < BS <= 376 | | |
| 25 | 376 < BS <= 440 | | |
| 26 | 440 < BS <= 515 | | |
| 27 | 515 < BS <= 603 | 251 | 1312097 < BS <= 1613447 |
| 28 | 603 < BS <= 706 | 252 | 1613447 < BS <= 1984009 |
| 29 | 706 < BS <= 826 | 253 | 1984009 < BS <= 2439678 |
| 30 | 826 < BS <= 967 | 254 | 2439678 < BS <= 3000000 |
| 31 | 967 < BS <=1132 | 255 | BS > 3000000 |

FIG. 15

| Index | Buffer Size (BS) value [bytes] |
|---|---|
| 0 | BS = 0 |
| 1 | 0 < BS <= 14 |
| 2 | 14 < BS <= 22 |
| 3 | 22 < BS <= 36 |
| 4 | 36 < BS <= 57 |
| 5 | 57 < BS <= 91 |
| 6 | 91 < BS <= 146 |
| 7 | 146 < BS <= 234 |
| 8 | 234 < BS <= 376 |
| 9 | 376 < BS <= 603 |
| 10 | 603 < BS <= 967 |
| 11 | 967 < BS <= 1552 |
| 12 | 1552 < BS <= 2490 |
| 13 | 2490 < BS <= 3995 |
| 14 | 3995 < BS <= 6411 |
| 15 | BS > 6411 |

FIG. 16

| Index | LCID values |
|---|---|
| 00000 | CCCH |
| 00001-01010 | Identity of the logical channel |
| 01011-10111 | Reserved |
| 11000 | D2D BSR |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

FIG. 17

| Index | LCID values |
|---|---|
| 00000 | CCCH |
| 00001-01010 | Identity of the logical channel |
| 01011-10101 | Reserved |
| 10110 | Truncated BSR for D2D |
| 10111 | Short BSR for D2D |
| 11000 | Long BSR for D2D |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

TERMINAL DEVICE, INTEGRATED CIRCUIT, AND WIRELESS COMMUNICATION METHOD

TECHNICAL FIELD

The present invention relates to a terminal device, an integrated circuit, and a wireless communication method.

This application claims the benefit of Japanese Priority Patent Application No. 2014-058169 filed on Mar. 20, 2014, the entire contents of which are incorporated herein by reference.

BACKGROUND ART

In the 3rd Generation Partnership Project (3GPP), a radio access scheme (Evolved Universal Terrestrial Radio Access (EUTRA)) and a radio access network (Evolved Universal Terrestrial Radio Access Network (EUTRAN)) for cellular mobile communication have been considered. EUTRA and EUTRAN are also referred to as Long-Term Evolution (LTE). In LTE, a base station apparatus is also referred to as an evolved NodeB (eNodeB) and a terminal device is also referred to as a User Equipment (UE). LTE is a cellular communication system in which an area is divided in a cellular pattern into multiple cells, each being served by a base station apparatus. A single base station apparatus may manage multiple cells.

In 3GPP, Proximity Services (ProSe) have been considered. ProSe includes ProSe discovery and ProSe communication. The ProSe discovery is a process that, using EUTRA, specifies that a terminal device is in proximity to a different terminal device. The ProSe communication is communication between two terminal devices that are in proximity to each other using a EUTRAN communication path that is established between the two terminals. For example, the communication path may be established directly between the terminal devices.

The ProSe discovery and the ProSe communication are also referred to as D2D discovery and D2D communication, respectively. The D2D discovery and the D2D communication are collectively also referred to as D2D.

In NPL 1, it is disclosed that a subset of resource blocks is reserved for the D2D, that a network configures a set of D2D resources, and that the terminal device is allowed to transmit a D2D signal using the configured resources.

CITATION LIST

Non-Patent Literature

NPL 1: "D2D for LTE Proximity Services: Overview", R1-132028, 3GPP TSG-RAN WG1 Meeting #73, 20-24 May 2013.

DISCLOSURE OF THE INVENTION

Problems to be Solved by the Invention

An object of the present invention, which was made in view of the situation described above, is to provide a terminal device, an integrated circuit that is built into the terminal device, and a wireless communication method that is used in the terminal device, in all of which processing associated with a Buffer Status Report (BSR) or a Scheduling Request (SR) can be efficiently performed.

Means for Solving the Problems (1) In order to accomplish the object described above, the present invention is contrived to provide the following means. That is, according to an aspect of the present invention, a terminal device that transmits a signal to a base station apparatus through uplink may include: an information generation unit that executes a logical channel prioritization procedure for the uplink in a case where initial transmission is performed and that considers a priority level for multiple MAC control elements in the logical channel prioritization procedure, in which at least a first MAC control element and a second MAC control element may be constituted in such a manner as to be included in the multiple MAC control elements, in which the first MAC control element may be constituted in such a manner as to be used for providing the base station apparatus with information on an amount of first data available for transmission within a first buffer for the uplink, in which the second MAC control element may be constituted in such a manner as to be used for providing the base station apparatus with information on amount of second data available for transmission within a second buffer for a first link that is used for communication between the terminal device and a different terminal device, and in which the first MAC control element may be constituted in such a manner as to have a higher priority level than the second MAC control element except for a case where the first MAC control element is included for padding.

(2) Furthermore, according to the aspect of the present invention, the second MAC control element may be constituted in such a manner as to have a higher priority level than the first MAC control element that is included for the padding, except for a case where the second MAC control element is included for the padding.

(3) Furthermore, according to the aspect of the present invention, the second MAC control element that is included for the padding may be constituted in such a manner as to have a higher priority level than the first MAC control element.

(4) Furthermore, according to the aspect of the present invention, a third MAC control element that is used for providing the base station apparatus with a power headroom report may be constituted in such a manner as to be included in the multiple MAC control elements, and the third MAC control element may be constituted to have a higher priority level than the second MAC control element.

(5) Furthermore, according to the aspect of the present invention, the first MAC control element may be constituted in such a manner as to have a higher priority level than the third MAC control element, except for a case where the first MAC control element is included for the padding.

(6) Furthermore, in the logical channel prioritization procedure according to the aspect of the present invention, an uplink resource may be constituted in such a manner as to be allocated in order of lowering the priority level.

(7) Furthermore, according to another aspect of the present, an integrated circuit that is built into a terminal device which transmits a signal to a base station apparatus through uplink may cause the terminal device to perform a sequence of functions that includes: a function of executing a logical channel prioritization procedure for the uplink in a case where initial transmission is performed, and of considering a priority level for multiple MAC control elements in the logical channel prioritization procedure, in which at least a first MAC control element and a second MAC control element may be constituted in such a manner as to be included in the multiple MAC control elements, in which the first MAC control element may be constituted in such a manner as to be used for providing the base station apparatus with information on an amount of first data available for transmission within a first buffer for the uplink, in which the second MAC control element may be constituted in such a manner as to be used for providing the base station apparatus with information on amount of second data available for transmission within a second buffer for a first link that is used for communication between the terminal device and a different terminal device, and in which the first MAC control element may be constituted in such a manner as to have a higher priority level than the second MAC control element except for a case where the first MAC control element is included for padding.

(8) Furthermore, in the integrated circuit according to the aspect of the present invention, the second MAC control element may be constituted in such a manner as to have a higher priority level than the first MAC control element that is included for the padding, except for a case where the second MAC control element is included for the padding.

(9) Furthermore, in the integrated circuit according to the aspect of the present invention, the second MAC control element that is included for the padding may be constituted in such a manner as to have has a higher priority level than the first MAC control element.

(10) Furthermore, in the integrated circuit according to the aspect of the present invention, a third MAC control element that is used for providing the base station apparatus with a power headroom report may constituted in such a manner as to be included in the multiple MAC control elements, and the third MAC control element may be constituted in such a manner as to have a higher priority level than the second MAC control element.

(11) Furthermore, in the integrated circuit according to the aspect of the present invention, the first MAC control element may be constituted in such a manner as to have a higher priority level than the third MAC control element, except for a case where the first MAC control element is included for the padding.

(12) Furthermore, in the integrated circuit according to the aspect of the prevent invention, in the logical channel prioritization procedure, an uplink resource may be constituted in such a manner as to be allocated in order of lowering the priority level.

(13) Furthermore, according to still another aspect of the present invention, a wireless communication method that is used in a terminal device which transmits a signal to a base station apparatus through uplink may include: executing a logical channel prioritization procedure for the uplink in a case where initial transmission is performed; and considering a priority level for multiple MAC control elements in the logical channel prioritization procedure, in which at least a first MAC control element and a second MAC control element may be constituted in such a manner as to be included in the multiple MAC control elements, in which the first MAC control element may be constituted in such a manner as to be used for providing the base station apparatus with information on an amount of first data available for transmission within a first buffer for the uplink, in which the second MAC control element may be constituted in such a manner as to be used for providing the base station apparatus with information on amount of second data available for transmission within a second buffer for a first link that is used for communication between the terminal device and a different terminal device, and in which the first MAC control element may be constituted in such a manner as to have a higher priority level than the second MAC control element except for a case where the first MAC control element is included for padding.

(14) Furthermore, in the wireless communication method according to the aspect of the present invention, the second MAC control element may be constituted in such a manner as to have a higher priority level than the first MAC control element that is included for the padding, except for a case where the second MAC control element is included for the padding.

(15) Furthermore, in the wireless communication method according to the aspect of the present invention, the second MAC control element that is included for the padding may be constituted in such a manner as to have a higher priority level than the first MAC control element.

(16) Furthermore, in the wireless communication method according to the aspect of the present invention, a third MAC control element that is used for providing the base station apparatus with a power headroom report may be constituted in such as manner as to be included in the multiple MAC control elements, and the third MAC control element may be constituted in such a manner as to have a higher priority level than the second MAC control element.

(17) Furthermore, in the wireless communication method according to the aspect of the present invention, the first MAC control element may be constituted in such a manner as to have a higher priority level than the third MAC control element, except for a case where the first MAC control element is included for the padding.

(18) Furthermore, in the wireless communication method according to the aspect of the present invention, in the logical channel prioritization procedure, an uplink resource may be constituted in such a manner as to be allocated in order of lowering the priority level.

Effects of the Invention

According to the invention, processing associated with a Buffer Status Report (BSR) or a Scheduling Request (SR) can be efficiently performed.

BRIEF DESCRIPTION OF THE DRAWINGS

FIG. 9 is a diagram illustrating one example of a buffer size reference that is indicated by a 6-bit buffer size field according to the embodiment of the present invention.

FIG. 10 is a diagram illustrating one example of an extended buffer size reference that is indicated by a 6-bit buffer size field according to the embodiment of the present invention.

FIG. 14 is a diagram illustrating one example of a buffer size reference that is indicated by an 8-bit buffer size field according to the embodiment of the present invention.

FIG. 15 is a diagram illustrating one example of a buffer size reference that is indicated by a 4-bit buffer size field according to the embodiment of the present invention.

FIG. 16 is a diagram illustrating one example of a logical channel ID for a UL-SCH according to the embodiment of the present invention.

FIG. 17 is a diagram illustrating another example of the logical channel ID for the UL-SCH according to the embodiment of the present invention.

MODE FOR CARRYING OUT THE INVENTION

Embodiments of the present invention will be described below.

According to the present embodiment, one or multiple cells are configured for a terminal device. A technology in which the terminal device performs communication through multiple cells is referred to as cell aggregation or carrier aggregation. The present invention may be applied to each of the multiple cells that are configured for the terminal device. Furthermore, the present invention may be applied to some of the multiple cells that are configured. A cell that is configured for the terminal device is also referred to as a serving cell.

Multiple serving cells that are configured include one primary cell, or one or multiple secondary cells. The primary cell is a serving cell in which an initial connection establishment procedure is executed, a serving cell in which a connection re-establishment procedure is started, or a cell that is indicated as a primary cell during a handover procedure. At a point in time at which a Radio Resource Control (RRC) connection is established, or later, the secondary cell may be configured.

In the case of the cell aggregation, a Time Division Duplex (TDD) scheme or a Frequency Division Duplex (FDD) scheme may be applied to all multiple cells. Furthermore, a cell to which the TDD scheme is applied and a cell to which the FDD scheme is applied may be aggregated.

Figure 1:
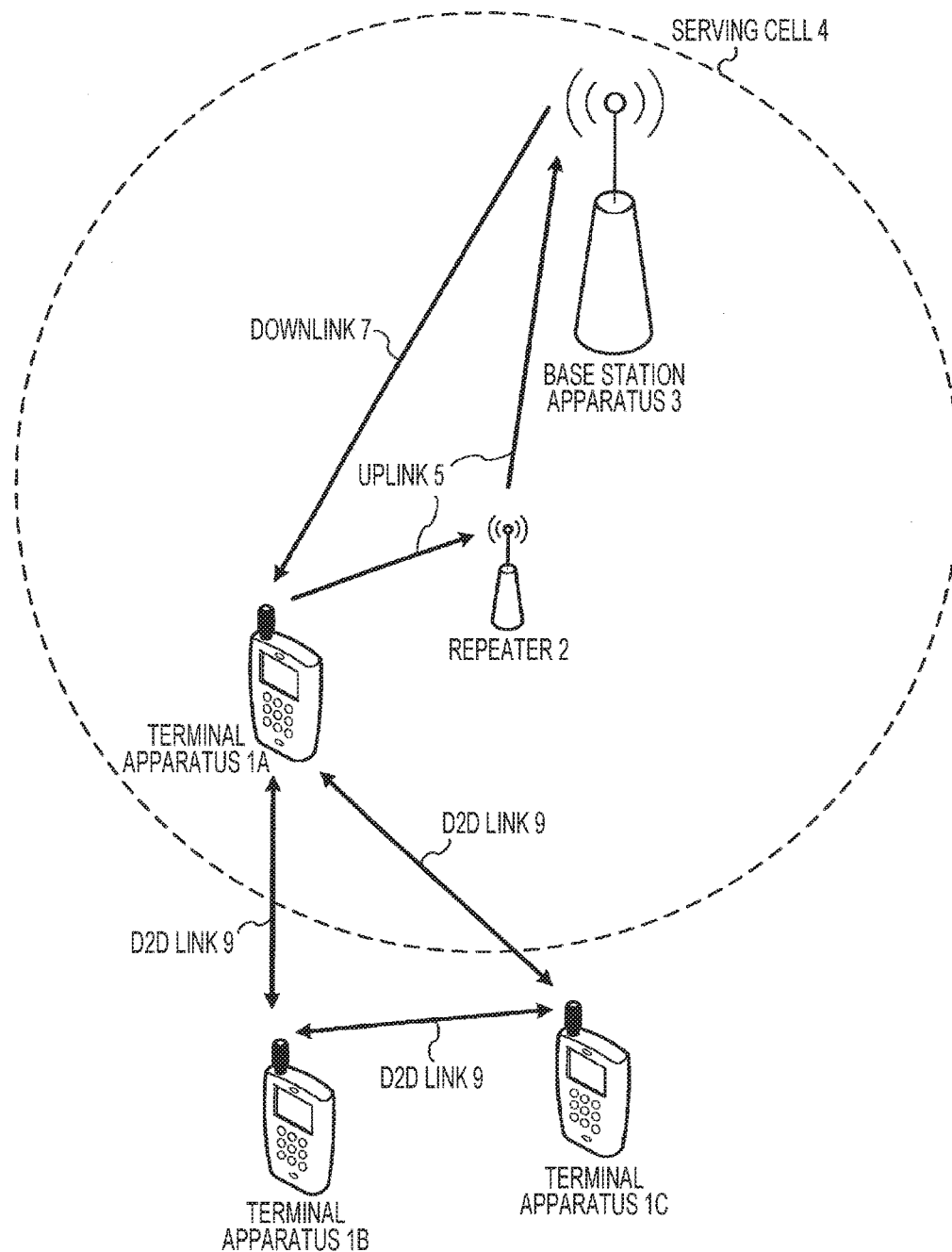
FIG. 1 is a conceptual diagram of a wireless communication system according to an embodiment of the present invention.

FIG. 1 is a conceptual diagram of a wireless communication system according to the present embodiment. In FIG. 1, the wireless communication system includes terminal devices 1A to 1C, a repeater 2, and a base station apparatus 3. The terminal devices 1A to 1C are referred to as a terminal device 1. The repeater 2 has a function of amplifying a signal that is received from the terminal device 1 and of transmitting the amplified signal. A serving cell 4 indicates an area that is covered by the base station apparatus 3 (LTE).

An uplink 5 is a link from the terminal device 1 to the base station apparatus 3. Moreover, in the uplink 5, a signal may be transmitted directly from the terminal device 1 to the base station apparatus 3 without involving the repeater. A downlink 7 is a link from the base station apparatus 3 to the terminal device 1. Furthermore, the uplink 5 and the downlink 7 are also referred to as a cellular link or a cellular communication path. Furthermore, communication between the terminal device 1 and the base station apparatus 3 is also referred to as cellular communication.

A D2D link 9 is a link between the terminal devices 1. Moreover, the D2D link 9 is also referred to as a D2D communication path, a ProSe link, or a ProSe communication path. D2D discovery and D2D communication are performed over the D2D link 9. The D2D discovery is a process/procedure that specifies that the terminal device 1 is in proximity to a different terminal device 1 using EUTRA. The D2D communication is communication between two terminal devices 1 that are in proximity to each other using an EUTRAN communication path that is established between the two terminal devices 1. For example, the communication path may be established directly between the terminal devices 1.

Moreover, the D2D link 9 may include a ProSe-assisted Wireless Local Area Network (WLAN) direct channel. For example, two terminal devices 1 that are in proximity to each other may be discovered based on the D2D discovery, EUTRAN may provide configuration information on a WLAN to the two terminal devices 1, and based on the configuration information on the WLAN, the two terminal devices 1 may establish the ProSe-assisted WLAN direct communication path. For example, the two terminal devices 1 that are in proximity to each other may be discovered based on the D2D discovery that uses EUTRAN, and the EUTRAN communication path or the ProSe-assisted Wireless Local Area Network (WLAN) direct communication path may be established between the two terminal devices 1 that are discovered.

Radio resource allocation methods in a case where, in this manner, the UE performs D2D communication using the D2D link 9 include two modes, that is, mode 1 and mode 2. Mode 1 is a mode in which the base station apparatus 3 schedules a resource that is used for the terminal device 1 to transmit a data signal or a control signal over the D2D link 9. However, the base station apparatus 3 may a relay station. The mode 2 is a mode in which the terminal device 1 itself selects the resource that is used for the terminal device 1 to transmit the data signal or the control signal over the D2D link 9, from a pool of available radio resources, and uses the selected resource. For the mode 2, the pool of available radio resources may be in advance determined, may be notified by the base station apparatus 3, and may be configured by a higher layer.

A physical channel and a physical signal according to the present embodiment are described.

The downlink physical channel and the downlink physical signal are collectively referred to as a downlink signal. An uplink physical channel and an uplink physical signal are collectively referred to as an uplink signal. The physical channel is used for transmitting information that is output from the higher layer. The physical signal is not used for transmitting the information that is output from the higher layer, but is used by a physical layer.

In FIG. 1, the following uplink physical channels are used for uplink wireless communication.

Physical Uplink Control Channel (PUCCH)
Physical Uplink Shared Channel (PUSCH)
Physical Random Access Channel (PRACH)

The PUCCH is a physical channel that is used for transmitting Uplink Control Information (UCI). Pieces of Uplink Control Information include Channel State Information (CSI) for downlink, a Scheduling Request (SR) indicating a request for a PUSCH resource, and an acknowledgement (ACK)/negative-acknowledgement (NACK) of downlink data (a Transport block or a Downlink-Shared Channel (DL-SCH)). The ACK/NACK is also referred to as a HARQ-ACK or HARQ feedback.

The PUSCH is a physical channel that is used for transmitting uplink data (Uplink-Shared Channel (UL-SCH)) and/or the HARQ-ACK and/or the Channel State Information.

The PRACH is a physical channel that is used for transmitting a random access preamble. The PRACH is used for the initial connection establishment procedure, the handover procedure, and the connection re-establishment procedure.

In FIG. 1, the following uplink physical signals are used for the uplink wireless communication.

Uplink Reference Signal (UL RS)

According to the present embodiment, the following two types of Uplink Reference Signals are used.

Demodulation Reference Signal (DMRS)
Sounding Reference Signal (SRS)

The DMRS is associated with transmission of the PUSCH or the PUCCH. The DMRS is time-multiplexed along with the PUSCH or the PUCCH. The base station apparatus 3 uses the DMRS in order to perform channel reconfiguration of the PUSCH or the PUCCH. Transmission of both of the PUSCH and the DMRS is referred to simply as transmission of the PUSCH. Transmission of both of the PUCCH and the DMRS is referred to simply as transmission of the PUCCH. The SRS is not associated with the transmission of the PUSCH or the PUCCH. The base station apparatus 3 uses the SRS in order to measure an uplink channel state.

In FIG. 1, the following downlink physical channels are used for downlink wireless communication.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used for broadcasting a Master Information Block (MIB) (Broadcast Channel (BCH)) that is used in a shared manner in the terminal device 1. For example, the MIB includes information indicating an SFN. The system frame number (SFN) is a radio frame number. The MIB is system information.

The PCFICH is used for transmitting information that indicates a region (an OFDM symbol) which is used for transmission of the PDCCH.

The PHICH is used for transmitting an HARQ indicator (the HARQ feedback) indicating an ACKnowledgement (ACK) of or a Negative ACKnowledgement (NACK) of the uplink data (Uplink Shared Channel (UL-SCH)) that is received by the base station apparatus 3.

The PDCCH and the EPDCCH are used for transmitting Downlink Control Information (DCI). The downlink control information is also referred to as a DCI format. The Downlink Control Information includes a downlink grant and an uplink grant. The downlink grant is also referred to as downlink assignment or downlink allocation.

The uplink grant is used for scheduling of a single PUSCH within a single cell. The uplink grant is used for the scheduling of a single PUSCH within a certain subframe. The downlink grant is used for scheduling of a single PDSCH within a single cell. The downlink grant is used for scheduling of the PDSCH within a subframe that is the same as the subframe in which the downlink grant is transmitted.

A Cyclic Redundancy Check (CRC) parity bit is attached to the DCI format. The CRC parity bit is scrambled with a Cell-Radio Network Temporary Identifier (C-RNTI). The C-RNTI is an identifier for identifying the terminal device 1 within a cell. The C-RNTI is used for controlling a resource of the PDSCH or a resource for the PUSCH within a single subframe.

The PDSCH is used for transmitting the downlink data (Downlink Shared Channel (DL-SCH)).

The PMCH is used for transmitting multicast data (Multicast Channel (MCH)).

In FIG. 1, the following downlink physical signals are used for the downlink wireless communication.

Synchronization Signal (SS)
Downlink Reference Signal (DL RS)

The synchronization signal is used in order for the terminal device 1 to be synchronized to a frequency domain and a time domain for the downlink. In the FDD scheme, the synchronization signal is mapped to subframes 0 and 5 within the radio frame.

The Downlink Reference Signal is used in order for the terminal device 1 to perform the channel reconfiguration of the downlink physical channel. The Downlink Reference Signal is used in order for the terminal device 1 to calculate the Channel State Information for the downlink. The Downlink Reference Signal is used in order for the terminal device 1 to measure a geographical location of the terminal device 1 itself.

In FIG. 1, the following D2D physical channels are used for wireless communication over the D2D link 9 between the terminal devices 1.

Physical D2D Control Channel (PD2DCCH)
Physical D2D Data Channel (PD2DDCH)

The PD2DCCH is a physical channel that is used for transmitting D2D link control information. The D2D link control information includes information indispensable for the terminal device 1 that receives a D2D signal to perform decoding. For example, pieces of information may be included such as an identifier of the terminal device 1 that receives D2D transmission data, a Modulation and Coding Scheme (MCS) that is used for the D2D transmission data, and a resource arrangement.

The PD2DDCH is a physical channel that is used for transmitting the D2D transmission data. However, a name of the above-mentioned D2D physical channel is one example, and other names thereof may be used. Furthermore, for the wireless communication over the D2D link 9 between the terminal devices 1, the Downlink Physical Channel or the Uplink Physical Channel may be used. The signal (the physical channel and the physical signal) that is transmitted and received over the D2D link 9 are also referred to as a signal that is used for the D2D, a signal for the D2D, or a D2D signal.

A logical channel will be described below. The logical channels define types of data transmission sizes that are transmitted and received with a Medium Access Control (MAC) layer. The logical channels include the following channels.

Broadcast Control Channel (BCCH)
Paging Control Channel (PCCH)
Common Control Channel (CCCH)
Dedicated Control Channel (DCCH)
Dedicated Traffic Channel (DTCH)

The BCCH is a downlink channel that is used for broadcasting system information.

The PCCH is a downlink channel that is used for transmitting paging information, and is used when a network does not know a cell position of the terminal device.

The CCCH is a channel that is used for transmitting control information between the terminal device and the network, and is used by the terminal device that does not have a Radio Resource Control (RRC) connection to the network.

The DCCH is a point-to-point bidirectional channel, and is a channel that is used for transmitting individual control information between the terminal device and the network.

The DCCH is used by the terminal device that has the RRC connection.

The DTCH is a point-to-point bidirectional channel, is a channel dedicated for one terminal device, and is used for transfer of user information (unicast data).

The BCH, the MCH, the UL-SCH, and the DL-SCH are transport channels. A channel that is used in the Medium Access Control (MAC) layer is referred to as a transport channel. A unit of data for the transport channel that is used in the MAC layer is also referred to as a transport block (TB) or a MAC Protocol Data Unit (PDU). Control of a Hybrid Automatic Repeat Request (HARQ) is performed for every transport block in the MAC layer. The transport block is a unit of data that the MAC layer delivers to the physical layer. In the physical layer, the transport block is mapped to a codeword, and coding processing is performed on every codeword.

A structure of the radio frame according to the present embodiment is described.

In LTE, two structures of the radio frame are supported. The two structures of the radio frame are frame structure type 1 and frame structure type 2. Frame structure type 1 is applicable to FDD. Frame structure type 2 is applicable to TDD.

Figure 2:
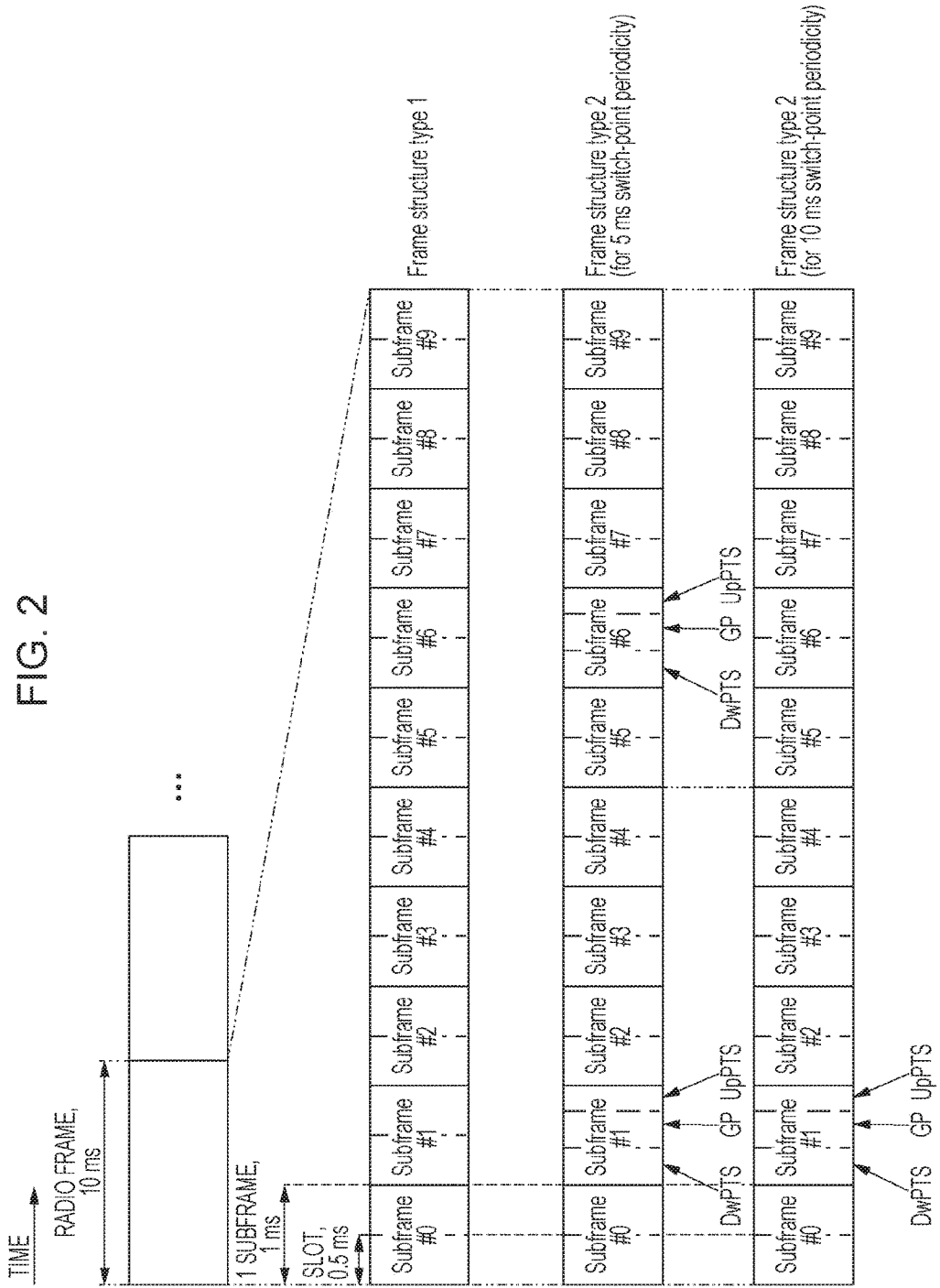
FIG. 2 is a diagram illustrating a schematic constitution of a radio frame according to the embodiment of the present invention.

FIG. 2 is a diagram illustrating a schematic constitution of the radio frame according to the present embodiment. In FIG. 2, the horizontal axis is a time axis. Furthermore, each of a type 1 radio frame and a type 2 radio frame is 10 ms long, and is defined by 10 subframes. Each of the subframes is 1 ms long, and is defined by two consecutive slots. Slots are each 0.5 ms long. An i-th subframe within the radio frame is constituted from a (2×i)-th slot and a (2×i+1)-th slot.

The following three types of subframes are defined for frame structure type 2.
downlink subframe
uplink subframe
special subframe The downlink subframe is a subframe that is reserved for downlink transmission. The uplink subframe is a subframe that is reserved for uplink transmission. The special subframe is configured from three fields. The three fields are a Downlink Pilot Time Slot (DwPTS), a Guard Period (GP), and an Uplink Pilot Time Slot (UpPTS). A sum of lengths of the DwPTS, the GP, and the UpPTS is 1 ms long. The DwPTS is a field that is reserved for the downlink transmission. The UpPTS is a field that is reserved for the uplink transmission. The GP is a field, the downlink transmission and the uplink transmission on which are not performed. Moreover, the special subframe may be constituted only from the DwPTS and the GP, and may be constituted only from the GP and the UpPTS.

A radio frame of frame structure type 2 is constituted at least from the downlink subframe, the uplink subframe, and the special subframe.

A constitution of the slot according to the present embodiment is described.

Figure 3:
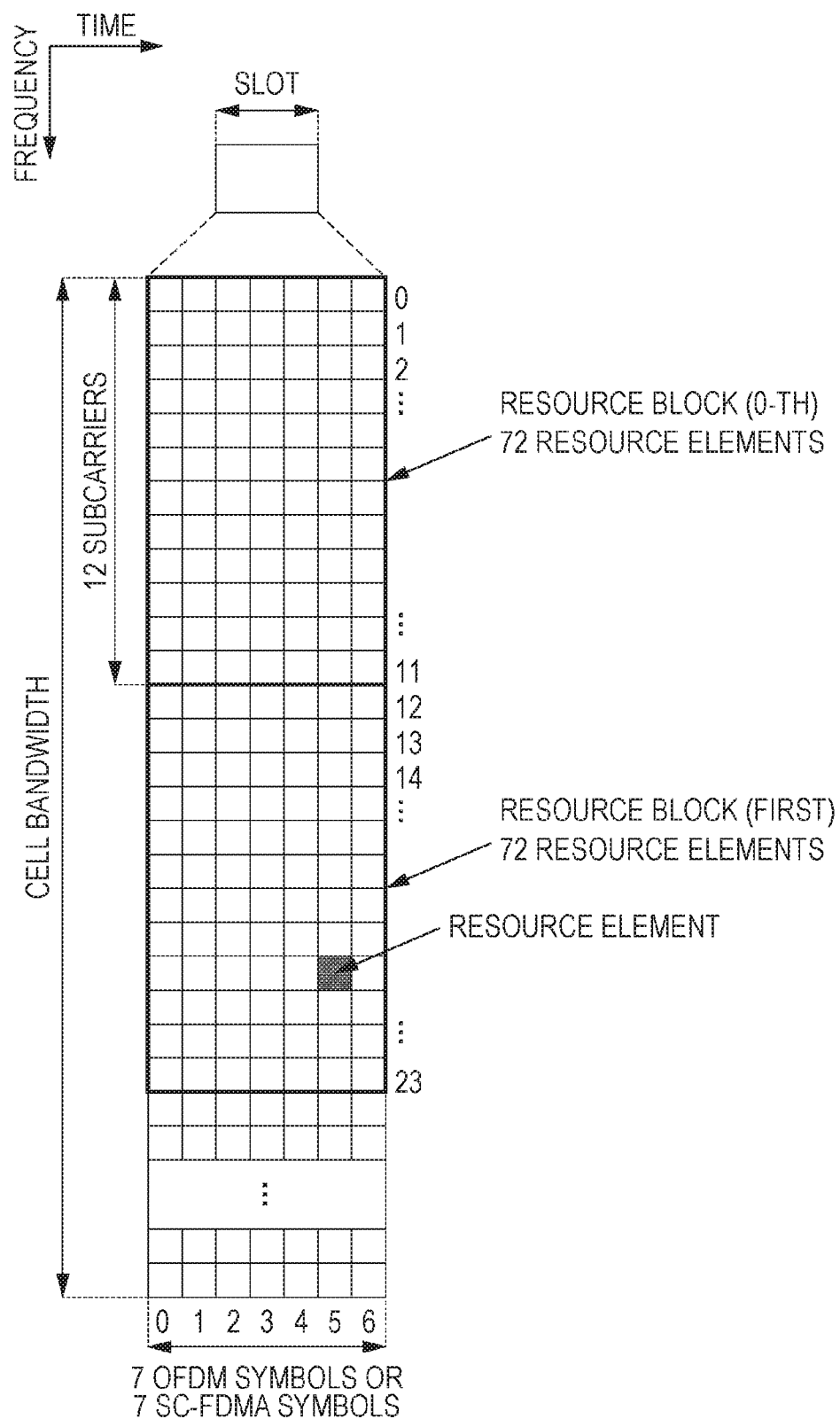
FIG. 3 is a diagram illustrating a constitution of a slot according to the embodiment of the present invention.

FIG. 3 is a diagram illustrating the constitution of the slot according to the present embodiment. In FIG. 3, a normal Cyclic Prefix (CP) is applied to the OFDM symbol or an SC-FDMA symbol. The physical signal or the physical channel that is transmitted on each of the slots is expressed by a resource grid. In FIG. 3, the horizontal axis is a time axis and the vertical axis is a frequency axis. In the downlink, the resource grid is defined by multiple subcarriers and multiple OFDM symbols. In uplink, the resource grid is defined by multiple subcarriers and multiple SC-FDMA symbols. For example, in a D2D link, the resource grid may be defined by multiple subcarriers and multiple SC-FDMA symbols. The number of subcarriers that constitute one slot depends on a cell bandwidth. The number of OFDM symbols or SC-FDMA symbols that constitute one slot is 7. Each of the elements within the resource grid is referred to as a resource element. The resource element is identified using a subcarrier number, and an OFDM symbol or SC-FDMA symbol number.

A resource block is used for expressing mapping of a certain physical channel (the PDSCH, the PUSCH, or the like) to resource elements. The resource block is defined by a virtual resource block and a physical resource block. A certain physical channel is first mapped to the virtual resource block. Thereafter, the virtual resource block is mapped to the physical resource block. One physical resource block is defined by 7 consecutive OFDM symbols or SC-FDMA symbols in the time domain and by 12 consecutive subcarriers in the frequency domain. Therefore, one physical resource block is constituted from (7×12) resource elements. Furthermore, one physical resource block corresponds to one slot in the time domain, and corresponds to 180 kHz in the frequency domain. The physical resource blocks are numbered from 0 in the frequency domain.

Moreover, an extended CP may be applied to the OFDM symbol or the SC-FDMA symbol. In the case of the extended CP, the number of OFDM symbols or SC-FDMA symbols that constitute one slot is 7.

Figure 4:
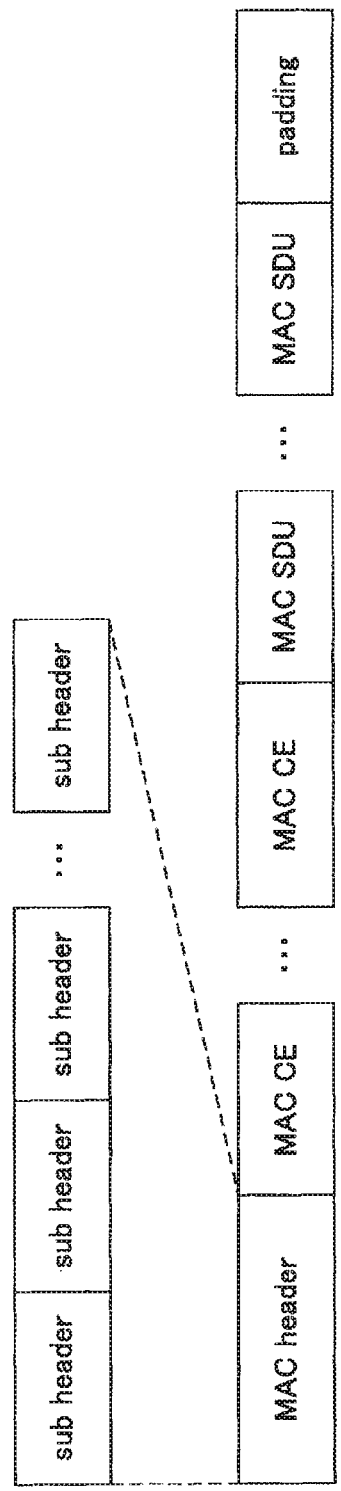
FIG. 4 is a diagram illustrating one example of a constitution of an MAC PDU according to the embodiment of the present invention.

FIG. 4 illustrates one example of the MAC PDU according to the present embodiment. One MAC PDU is constituted from one MAC header, 0 or more MAC Service Data Units (MAC SDUs), 0 or more MAC Control Element (MAC CE), and padding.

The MAC header is constituted from multiple subheaders, and each subheader corresponds to the MAC SDU, the MAC CE, and the padding within the same MAC PDU. Included in the subheader is information, such as a size of the corresponding MAC SDU or MAC CE, or a padding bit, if need arises, in addition to the corresponding MAC SDU or MAC CE, or what is indicated by a logical channel ID of padding. One example of a logical channel ID within the subheader will be described below.

The MAC CEs that are applicable in the MAC PDU which is mapped to the UL-SCH include BSR MAC CE (which, in some cases, is referred to as an MAC BSR CE) for reporting a Buffer Status Report (BSR) for uplink, a D2D BSR MAC CE for reporting the BSR in the D2D link, a C-RNTI MAC CE for notifying the Cell-Radio Network Temporary Identifier (C-RNTI), and a PH MAC CE for reporting a Power Headroom (PH) (capacity available for transmit power).

The BSR MAC CE is used for providing information relating to an amount of data available for transmission, which is included in an uplink buffer or a D2D buffer in the terminal device 1, to the base station apparatus 3. The D2D BSR MAC CE is used for providing information relating to the amount of data available for transmission, which is included in the D2D buffer in the terminal device 1, to the base station apparatus 3. The BSR will be described below.

Figure 5:
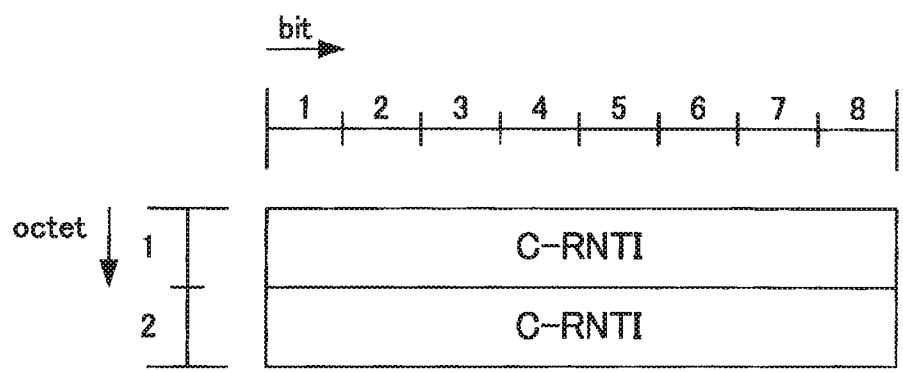
FIG. 5 is a diagram illustrating one example of a constitution of a C-RNTI MAC CE according to the embodiment of the present invention.

The C-RNTI MAC CE includes a C-RNTI for identifying by which terminal device within a cell a signal is transmitted. FIG. 5 is one example illustrating a constitution of the C-RNTI MAC CE. The C-RNTI MAC CE is constituted from a C-RNTI field that includes a C-RNTI of the terminal device. The C-RNTI field is 16 bits (2 octets) long. The C-RNTI MAC CE is identified by the corresponding MAC PDU subheader.

Figure 6:
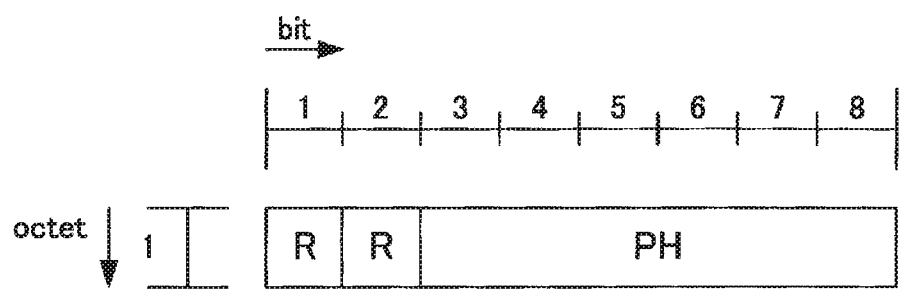
FIG. 6 is a diagram illustrating one example of a constitution of a PH MAC CE according to the embodiment of the present invention.

The PH MAC CE is used for the PH that provides the base station apparatus 3 with information relating to a difference between nominal UE maximum transmit power of the terminal device 1 for every serving cell which is activated and power that is obtained for transmission of the UL-SCH, and information relating to a difference between the nominal UE maximum transmit power of the terminal device 1 in the primary cell and power that is obtained for transmission of the UL-SCH and the PUCCH. FIG. 6 is one example illustrating a constitution of the PH MAC CE. The PH MAC CE is constituted from 8 bits (one octet), which are a sum of reserved two bits that are set to 0 and 6 bits for a PH field indicating the PH. The PH MAC CE is identified by the corresponding MAC PDU subheader. However, in a case where transmission is performed using multiple serving cells, an extended PH MAC CE for notifying the PH for every serving cell may be used.

The BSR and the Scheduling Request (SR) according to the present embodiment will be described below.

In a case where the uplink data or D2D data available for transmission in the terminal device 1 occurs and where a UL-SCH resource is not allocated, the SR is transmitted to the base station apparatus 3 using the PUCCH that is allocated from the base station apparatus 3. For example, the uplink data is data on the logical channel in the uplink. For example, the D2D data is data on the logical channel in the D2D link.

Moreover, in a case where the D2D data available for transmission in the terminal device 1 occurs and where the UL-SCH resource is not allocated, the terminal device 1 for which mode 2 is configured may not transmit the SR to the base station apparatus 3 using the PUCCH that is allocated from the base station apparatus 3.

That is, in a case where the D2D data available for transmission in the terminal device 1 for which mode 1 is configured occurs, and where the UL-SCH resource is not allocated, the SR is triggered. Furthermore, in a case where the D2D data available for transmission in the terminal device 1 for which the mode 2 is configured occurs, and where the UL-SCH resource is not allocated, the SR is not triggered. The terminal device 1 on which reconfiguration from mode 1 to mode 2 is performed may cancel the SR that is triggered only for the reason that the D2D data available for transmission in the terminal device 1 occurs and that the UL-SCH resource is not allocated.

After the SR is transmitted, in a case where the UL-SCH is allocated from the base station apparatus 3, the terminal device 1 transmits the BSR indicating buffer status information on the uplink data or the D2D data of the terminal device 1 to the base station apparatus 3 on the UL-SCH resource that is allocated. According to the present embodiment, the BSR for the uplink transmission data is referred to as an uplink BSR, and the BSR for the D2D transmission data is referred to as a D2D BSR. In a case where the uplink BSR is received from the terminal device 1, the base station apparatus 3 performs scheduling of the uplink data to the terminal device 1. In a case where the D2D BSR is received from the terminal device 1, the base station apparatus 3 performs scheduling of the D2D data to the terminal device 1.

After the SR is transmitted, in a case where the UL-SCH is not allocated from the base station apparatus 3, the terminal device 1 transmits the SR again. Although retransmission of the SR is repeated a prescribed number of times, in a case where the UL-SCH is not allocated from the base station apparatus 3, the terminal device 1 releases the PUCCH and the SRS that are allocated, and thus executes a random access procedure.

Next, the uplink BSR according to the present embodiment will be described below.

In the uplink, logical channels are categorized into Logical Channel Groups (LCGs). With the uplink BSR, an amount of transmission data buffer for the uplink data that corresponds to each LCG is notified, as a message of the MAC layer, to the base station apparatus.

According to a triggering condition, the uplink BSRs includes a regular BSR, a periodic BSR, and a padding BSR.

In a case where data on a logical channel that belongs to a certain LCG is available for transmission, and where the data has a higher priority level than the logical channel that is already available for transmission, which belongs to any one of the LCGs, or in a case where data available for transmission is not present on the logical channel that belongs to any one of the LCGS, the regular BSR is triggered. Furthermore, in a case where a prescribed retransmission timer retxBSR-Timer expires, and where the UE has data available for transmission on the logical channel that belongs to a certain LCG, the regular BSR is triggered.

In a case where a prescribed timer periodic BSR-Timer expires, the periodic BSR is triggered.

In a case where the UL-SCH is allocated and where the number of padding bits is equal to or greater than sizes of the BSR MAC CE and the subheader thereof, the padding BSR is triggered.

Furthermore, a format for the MAC CE on which the uplink BSR is transmitted includes a Long BSR, a Short BSR, and a Truncated BSR.

Figure 7:
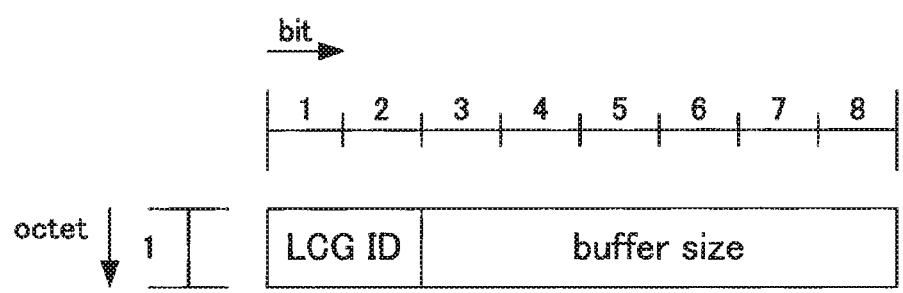
FIG. 7 is a diagram illustrating one example of a constitution of a BSR MAC CE that uses a Short BSR according to the embodiment of the present invention.

FIG. 7 illustrates one example of a constitution of the Long BSR or the Short BSR in a case where the number of LCGs is 4. In FIG. 7, the Short BSR or the Truncated BSR is constituted from 8 bits (one octet), which are a sum of a 2-bit LCG ID field indicating for which LCG the Buffer Status Report is and a 6-bit buffer size field indicating a buffer size of the LCG, and it is possible that the Buffer Status Report for one LCG is transmitted.

The buffer size field indicates a total amount of available data that is delivered to all logical channels in the logical channel group after all MAC PDUs are built at Transmission Time Interval (TTI).

Figure 8:
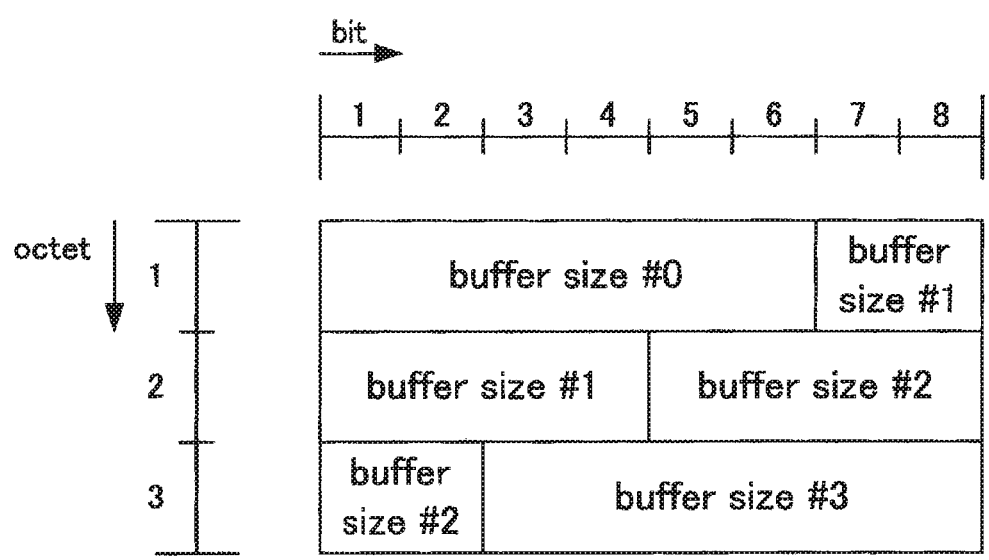
FIG. 8 is a diagram illustrating one example of a constitution of a BSR MAC CE that uses a long BSR according to the embodiment of the present invention.

FIG. 8 indicates one example of a constitution of the long BSR in a case where the number of LCGs is 4. In FIG. 8, the Long BSR is constituted from 24 bits (3 octets), which are a sum of bits for four buffer size fields that indicate buffer sizes of LCGs that have LCG IDs #0 to #3, respectively, and it is possible that the Buffer Status Reports for all four LCGs are transmitted.

One example of a buffer size reference that is indicated by 6-bit buffer size fields for the Short BSR, the Truncated BSR, and the Long BSR is illustrated in FIGS. 9 and 10. In a case where a parameter extendedBSR-Sizes for the higher layer is not configured, the terminal device 1 uses the buffer size reference that is illustrated in FIG. 9. In a case where extendedBSR-Sizes is configured, the terminal device 1 uses an extended buffer size reference that is illustrated in FIG. 10.

In a case where the regular BSR and the periodic BSR are performed, if data available for transmission on two or more LCGs is present at the TTI at which the BSR is transmitted, the terminal device 1 reports the Long BSR. If not, the terminal device 1 reports the Short BSR.

In a case where the padding BSR is performed, if, at the TTI at which the BSR is transmitted, the number of padding bits is equal to or greater than sizes of a MAC CE on which the Long BSR is transmitted and of a subheader thereof, the terminal device 1 reports the Long BSR. In a case where the number of padding bits is less than the sizes of the MAC CE on which the Long BSR is transmitted and of the subheader thereof, but is equal to or greater than sizes of a MAC CE on which the Short BSR is transmitted and of a subheader thereof, the terminal device 1 performs a subsequent operation. In a case where data available for transmission on two or more LCGs is present, the Truncated BSR for the LCG that has the highest priority level is reported. In the other cases, the Short BSR is reported.

The uplink BSRs that are all triggered are canceled in the following cases.

(1) A case where the BSR is included in the MAC PDU
(2) A case where all pieces of uplink data within the buffer are available for transmission on the UL-SCH that is allocated by the uplink grant, but a resource is insufficient for sending added BSR MAC CE and a subheader thereof.

Next, the D2D BSR according to the present embodiment will be described below.

With the D2D BSR, an amount of buffer for the D2D transmission data on the logical channel that is usable for the D2D communication is notified, as the message of the MAC layer, to the base station apparatus. One aspect of the D2D BSR is that with the D2D BSR, an amount of buffer for the transmission data on the logical channel is notified with the logical channel usable for the D2D communication as one type. However, in a case where there are two or more types of logical channels that are usable for the D2D communication, the amount of buffer for the transmission data on each logical channel or the amount of buffer for the transmission data on every LCG that is made up of two or more types of logical channels may be notified as is the case with the uplink BSR. Furthermore, as is the case with the uplink BSR, the triggering condition for the D2D BSR may be that all of the regular BSR, the periodic BSR, and the padding BSR are used, and only some of the triggering conditions may be used.

Next, a format for the D2D BSR MAC CE is described.

Figure 11:
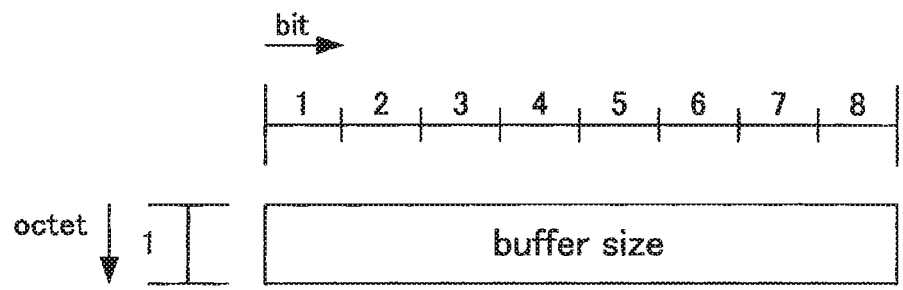
FIG. 11 is a diagram illustrating one example of a constitution of a D2D BSR MAC CE that uses a second Short BSR according to the embodiment of the present invention.
Figure 12:
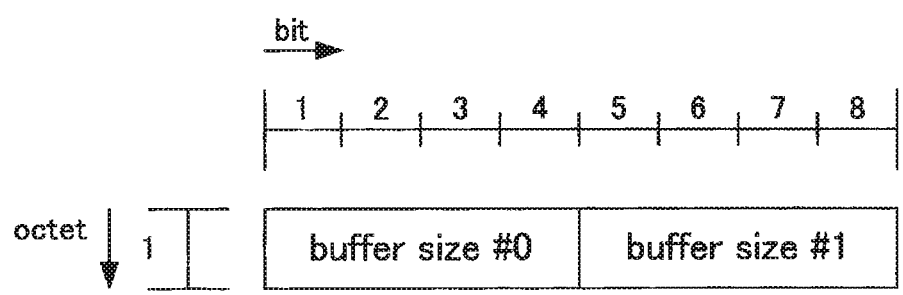
FIG. 12 is a diagram illustrating one example of the constitution of the D2D BSR MAC CE that uses a third Short BSR according to the embodiment of the present invention.
Figure 13:
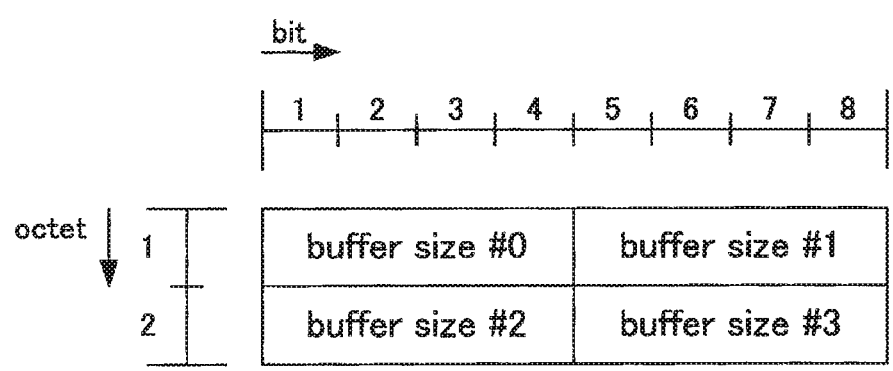
FIG. 13 is a diagram illustrating one example of the constitution of the D2D BSR MAC CE that uses a middle BSR according to the embodiment of the present invention.

For the D2D BSR MAC CE, the Short BSR or the Truncated BSR in FIG. 7 and the Long BSR in FIG. 8, each of which is the same format as for the uplink BSR, may be used, and different formats may be used. For example, in a case where the number of LCGs that are used for the D2D is 1, as illustrated in FIG. 11, an LCG ID format may not be used and a second Short BSR may be used. For example, in a case where the number of LCGs that are used for the D2D is 2, as illustrated in FIG. 12, a third Short BSR may be used that uses two 4-bit buffer size fields that have LCG IDs #0 and #1. Furthermore, for example, in a case where the number of LCGs that are used for the D2D is 4, as illustrated in FIG. 13, a middle BSR may be used that is constituted from two octets that are used for four 4-bit buffer size fields.

In a case where the same format as for the uplink BSR is used, for a 6-bit buffer size field, the same buffer size reference and extended buffer size reference as for the uplink BSR can be used as illustrated in FIGS. 9 and 10. However, in a case where the buffer size reference that is used for the uplink BSR is replaced with extendedBSR-Sizes, the buffer size reference in FIG. 9 may be applied at all times for the D2D BSR. That is, in a case where extendedBSR-Sizes is set, the extended buffer reference may not be used for the D2D BSR.

Furthermore, for the D2D BSR, a parameter for the higher layer with which the buffer size reference is replaced may be used independently of the uplink. In this case, in a case where distribution of buffer sizes for the uplink BSR and distribution of buffer sizes for the D2D BSR are different from each other, different buffer size references can be configured.

However, for the D2D BSR, a buffer size reference that is different from that for the uplink BSR may be used. For example, an 8-bit buffer size reference that is illustrated in FIG. 14 may be used, and a 4-bit buffer size reference that is illustrated in FIG. 15 may be used. Accordingly, it is possible that the second Short BSR or the third Short BSR is applied.

FIG. 16 illustrates one example of the logical channel ID for the UL-SCH according to the present embodiment. With a 5-bit logical channel ID that is shown for every MAC PDU subheader in the MAC PDU header, the base station apparatus can identify the corresponding MAC CE, MAC SDU, and padding.

However, in FIG. 16, this is effectively possible in a case where only one type of D2D BSR format (for example, the Short BSR) is used. However, a logical channel ID in FIG. 17 may be applied in a case where the Short BSR, the Truncated BSR, and the Long BSR are used for the D2D BSR.

In addition, a logical channel ID that is an arbitrary number may be applied to the D2D BSR.

An operation that is performed by the terminal device according to the present invention in a case where multiple logical channels are included in the uplink data that has to be transmitted will be described below.

The MAC layer has a function of mapping each logical channel to the MAC PDU, and in a case where new transfer is performed, uses a Logical Channel Prioritization (LCP) procedure. In a basic LCP procedure, a transmission priority level of the transmission data is determined considering a priority level of each logical channel and a transmission bit rate (Prioritized Bit Rate (PBR)) that has to be transmitted within a fixed period, which corresponds to Quality of Service (QoS) of a radio bearer, and mapping to the MAC PDU is performed starting from data with the highest priority level at the point in time when the uplink grant is received.

The RRC layer controls the scheduling of the uplink data by signaling a parameter priority indicating that the greater a value is, the lower a priority is, a parameter prioritizedBitRate indicating a Prioritized Bit Rate (PBR), and a parameter bucketSizeDuration indicating a bucket size duration (BSD).

The terminal device 1 retains a variable Bj for each logical channel j. Bj is initialized to zero in a case where an associated logical channel is established, and a value (PBR× TTI duration) that is obtained by multiplying the PBR or a TTI duration is added in the logical channel j at every TTI. However, in a case where a value of Bj does not exceed a packet size and the value of Bj is greater than a packet size of the logical channel j, the value of Bj is set to the packet size. The packet size in a certain logical channel is equal to PBR×BSD.

The terminal device 1 allocates a resource to the logical channel according to the following procedure.

Step 1: All logical channel satisfying Bj>0 are allocated in order of lowering priority level. In a case where a PBR of a certain radio bearer is set to infinity, the terminal device 1 allocates a resource to data available for transmission on all radio bearers before determining a PBR of another radio bearer that has a low priority level.

Step 2: The terminal device 1 subtracts from Bj a sum of sizes of the MAC SDUs that are allocated to the logical channel j in Step 1. However, Bj can take a negative value.

Step 3: In a case where there are unoccupied resources, all logical channels are allocated in order of lowering priority level regardless of the value of Bj until data on the logical channel or the uplink grant is not present. Allocation is equally performed on the logical channels that have equal priority levels.

The priority levels in the LCP procedure according to the present embodiment are arranged in order of lowering priority level as follows.

C-RNTI MAC CE or data from UL-CCCH
BSR MAC CE that excludes the padding BSR
D2D BSR MAC CE that excludes the padding BSR
PHR MAC CE or Extended PHR MAC CE
Data from the logical channels from which the UL-CCCH is excluded
BSR MAC CE using the padding BSR
D2D BSR MAC CE using the padding BSR In this manner, a higher priority level for the MAC CE for the uplink BSR is configured than for the MAC CE for the D2D BSR, and thus in a case where the uplink BSR and the D2D BSR are triggered at the same time, resources for allocating the BSR MAC CE can be precluded from being insufficient due to the allocation of the D2D BSR MAC CE. Notification of the uplink BSR is indispensable for the terminal device 1 to allocate the uplink resource from the base station apparatus 3. In a case where, for this reason, the D2D BSR MAC CE is allocated, and thus the uplink BSR is not notified to the base station apparatus 3, it is considered that SR processing is sought for the uplink BSR, that a delay occurs in allocation for uplink communication, and that communication efficiency decreases.

However, a priority level of the D2D BSR MAC CE may differ from the perspective that the MAC CE relating to the uplink takes precedence over the MAC CE relating to the D2D. For example, the D2D BSR MAC CE may have a lower priority level than the PHR MAC CE or the Extended PHR MAC CE, and may have a lower priority level than data from the logical channels from which the UL-CCCH is excluded.

However, an arbitrary priority level may be configured between the BSR MAC CE using the padding BSR and the D2D BSR MAC CE using the padding BSR.

For example, in a case where the Short BSR, the Truncated BSR, and the Long BSR are usable with the BSR MAC CE and where only the Short BSR is usable with the D2D BSR MAC CE, the terminal device 1 may perform the following operation according to the number of padding bits.

In a case where the number of padding bits is equal to or greater than sizes of one Short BSR and a subheader thereof and is smaller than sizes of two Short BSRs and subheaders thereof, the terminal device 1 performs the following operation.

In a case where at the TTI at which the BSR is transmitted, data available for transmission on the uplink is not present and data available for transmission with the D2D is present, the D2D BSR that uses the Short BSR is transmitted.

In a case where at the TTI at which the BSR is transmitted, data available for transmission on two or more LCGs in the uplink is present, the uplink BSR that uses the Truncated BSR for the LCG that has the highest priority level is transmitted.

In the other cases, the uplink BSR that uses the Short BSR is transmitted.

In a case where the number of padding bits is equal to or greater than sizes of two Short BSRs and subheaders thereof and is smaller than sizes of one Long BSR and a subheader thereof, the terminal device 1 performs the following operation.

In a case where at the TTI at which the BSR is transmitted, data available for transmission with the D2D is present, the D2D BSR that uses the Short BSR is transmitted.

In a case where at the TTI at which the BSR is transmitted, data available for transmission on two or more LCGs in the uplink is present, the uplink BSR that uses the Truncated BSR for the LCG that has the highest priority level is transmitted.

In a case where at the TTI at which the BSR is transmitted, data available for transmission on one LCG in the uplink is present, or in a case where data available for transmission on the uplink is not present, the uplink BSR that uses the Short BSR is transmitted.

In a case where the number of padding bits is equal to or greater than sizes of one Long BSR and a subheader thereof and is smaller than sizes of one Long BSR, one Short BSR, and subheaders of these, the terminal device 1 performs the following operation.

In the case where at the TTI at which the BSR is transmitted, the data available for transmission on two or more LCGs in the uplink is present, the uplink BSR that uses the Long BSR is transmitted.

In the case where at the TTI at which the BSR is transmitted, the data available for transmission on one LCG in the uplink is present, or in the case where the data available for transmission on the uplink is not present, the uplink BSR that uses the Short BSR and the D2D BSR that uses the Short BSR are transmitted.

In a case where the number of padding bits is equal to or greater than sizes of one Long BSR, one Short BSR, and subheaders of these, the terminal device 1 performs the following operation.

At the TTI at which the BSR is transmitted, the uplink BSR that uses the Long BSR and the D2D BSR that uses the Short BSR are transmitted.

Furthermore, in a case where each of the Short BSR, the Truncated BSR, and the Long BSR is usable with the BSR MAC CE and the D2D BSR MAC CE, the terminal device 1 may perform the following operation according to the number of padding bits.

In the case where the number of padding bits is equal to or greater than sizes of one Short BSR and a subheader thereof and is smaller than sizes of two Short BSRs and subheaders thereof, the terminal device 1 performs the following operation.

In a case where at the TTI at which the BSR is transmitted, data available for transmission on the uplink is not present and data available for transmission on two or more LCGs for the D2D is present, the D2D BSR that uses the Truncated BSR for the LCG that has the highest priority level is transmitted.

In a case where at the TTI at which the BSR is transmitted, data available for transmission on the uplink is not present and data available for transmission on one LCG for the D2D is present, the D2D BSR that uses the Short BSR is transmitted.

In the case where at the TTI at which the BSR is transmitted, the data available for transmission on two or more LCGs in the uplink is present, the uplink BSR that uses the Truncated BSR for the LCG that has the highest priority level is transmitted.

In the other cases, the uplink BSR that uses the Short BSR is transmitted.

In the case where the number of padding bits is equal to or greater than sizes of two Short BSRs and subheaders thereof and is smaller than sizes of one Long BSR and a subheader thereof, the terminal device 1 performs the following operation.

In a case where at the TTI at which the BSR is transmitted, the data available for transmission on two or more LCGs for the D2D is present, the D2D BSR that uses the Truncated BSR for the LCG that has the highest priority level is transmitted.

In a case where at the TTI at which the BSR is transmitted, data available for transmission on one LCG for the D2D is present, or in a case where data available for transmission with the D2D is not present, the D2D BSR that uses the Short BSR is transmitted.

In a case where at the TTI at which the BSR is transmitted, data available for transmission on two or more LCGs in the uplink is present, the uplink BSR that uses the Truncated BSR for the LCG that has the highest priority level is transmitted.

In the case where at the TTI at which the BSR is transmitted, the data available for transmission on one LCG in the uplink is present, or in the case where the data available for transmission on the uplink is not present, the uplink BSR that uses the Short BSR is transmitted.

In the case where the number of padding bits is equal to or greater than sizes of one Long BSR and a subheader thereof and is smaller than sizes of one Long BSR, one Short BSR, and subheaders of these, the terminal device 1 performs the following operation.

In the case where at the TTI at which the BSR is transmitted, the data available for transmission on two or more LCGs in the uplink is present, the uplink BSR that uses the Long BSR is transmitted.

In a case where at the TTI at which the BSR is transmitted, the data available for transmission on the uplink is not present and data available for transmission on two or more LCGs in the D2D link is present, the D2D BSR that uses the Long BSR is transmitted.

In a case where at the TTI at which the BSR is transmitted, data available for transmission on one LCG in the uplink is present and data available for transmission on two or more LCGs in the D2D link is present, the uplink BSR that uses the Short BSR and the D2D BSR that uses the Truncated BSR for the LCG that has the highest priority level in the D2D link are transmitted.

In the other cases, the uplink BSR that uses the Short BSR and the D2D BSR that uses the Short BSR are transmitted.

In a case where the number of padding bits is equal to or greater than sizes of one Long BSR, one Short BSR, and subheaders of these and is smaller than sizes of two Long BSRs, and subheaders of these, the terminal device 1 performs the following operation.

In a case where at the TTI at which the BSR is transmitted, data available for transmission on two or more LCGs with the D2D is not present, the uplink BSR that uses the Long BSR and the D2D BSR that uses the Short BSR are transmitted.

In a case where at the TTI at which the BSR is transmitted, data available for transmission on two LCGs in the uplink is not present and data available for transmission on two or more LCGs for the D2D is present, the uplink BSR that uses the Short BSR and the D2D BSR that uses the Long BSR are transmitted.

In a case where at the TTI at which the BSR is transmitted, data available for transmission on two or more LCGs in the uplink is present and data available for transmission on two or more LCGs for the D2D is present, the uplink BSR that uses the Long BSR and the D2D BSR that uses the Truncated BSR for the LCG that has the highest priority level in the D2D link are transmitted.

In a case where the number of padding bits is equal to or greater than sizes of two or more Long BSRs and subheaders of these, the uplink BSR that uses the Long BSR and the D2D BSR that uses the Long BSR are transmitted.

With this operation, the uplink BSR and the D2D BSR can be efficiently transmitted using the padding bit.

However, the uplink BSR is described above as taking precedence over the D2D BSR in a case where the padding BSR is transmitted, but it is effectively possible that the D2D BSR also takes precedence in the transmission. In this case, for the regular BSR or the periodic BSR, the uplink BSR takes precedence over the D2D BSR, and thus the D2D BSR that uses the padding BSR can compensate for the missing of opportunity for the transmission of the D2D BSR.

However, in a case where the padding BSR is transmitted, an arbitrary BSR that is selected by the terminal device 1 from the uplink BSR and the D2D BSR may be transmitted.

However, in the case where the padding BSR is transmitted, the uplink BSR and the D2D BSR may be alternately transmitted. That is, of the uplink BSR and the D2D BSR, the BSR that is not transmitted with the last padding BSR may be transmitted.

Furthermore, in a case where at one TTI, the terminal device 1 is requested to transmit multiple MAC PDUs, the terminal device 1 may perform some or all of the following operations.

The uplink BSR and the D2D BSR are included in the same MAC PDU, or in different MAC PDUs.

The padding BSR for the uplink is included in the MAC PDU that does not include the regular BSR for the uplink or the periodic BSR for the uplink.

The padding BSR for the D2D link is included in the MAC PDU that does not include the regular BSR for the D2D link and the periodic BSR for the D2D link.

For example, in a case where at one TTI, the terminal device 1 is requested to transmit multiple MAC PDUs and the regular BSR, the periodic BSR, or the padding BSR for the uplink are included in a first MAC PDU, the regular BSR, the periodic BSR, or the padding BSR for the D2D link may be included in a second MAC PDU.

For example, in a case where at one TTI, the terminal device 1 is requested to transmit multiple MAC PDUs, and the regular/periodic BSR for the uplink, and the padding BSR for the D2D link are included in the first MAC PDU, the regular/periodic BSR for the D2D link and the padding BSR for the uplink may be included in the second MAC PDU, and the padding BSR for the uplink and the padding BSR for the D2D link may be included in the third MAC PDU.

However, it is desirable that only at most one BSR MAC CE and one D2D BSR MAC CE are included in one MAC PDU. In a case where, in this condition, at a timing at which it is possible that the BSR is transmitted, multiple events trigger the uplink BSR, the regular BSR and the periodic BSR take precedence over the padding BSR. In the case where, in this condition, at the time at which it is possible that the BSR is transmitted, multiple events trigger the D2D BSR, the regular BSR and the periodic BSR take precedence over the padding BSR.

Furthermore, only at most one BSR MAC CE or one D2D BSR MAC CE may be included in the MAC PDU. In a case where, in this condition, at the timing at which it is possible that the BSR is transmitted, multiple events trigger the uplink BSR and the D2D BSR, it is desirable that the D2D BSR using the padding BSR takes precedence over the uplink BSR using the regular BSR and the periodic BSR.

As described above, with the uplink BSR and the D2D BSR, different MAC CEs (the BSR MAC CE and the D2D BSR MAC CE) are defined. However, according to another aspect of the present invention, it is effectively possible that the D2D BSR is allocated to one LCG that is notified by the uplink BSR. For example, in a case where four LCGs are used for the BSR MAC CE, one LCG may be allocated to the D2D BSR. Which LCG is allocated to the D2D BSR, for example, may be determined as is the case with LCG ID #4, and may be configured by higher layer signaling.

A constitution of the device according to the present embodiment will be described below.

Figure 18:
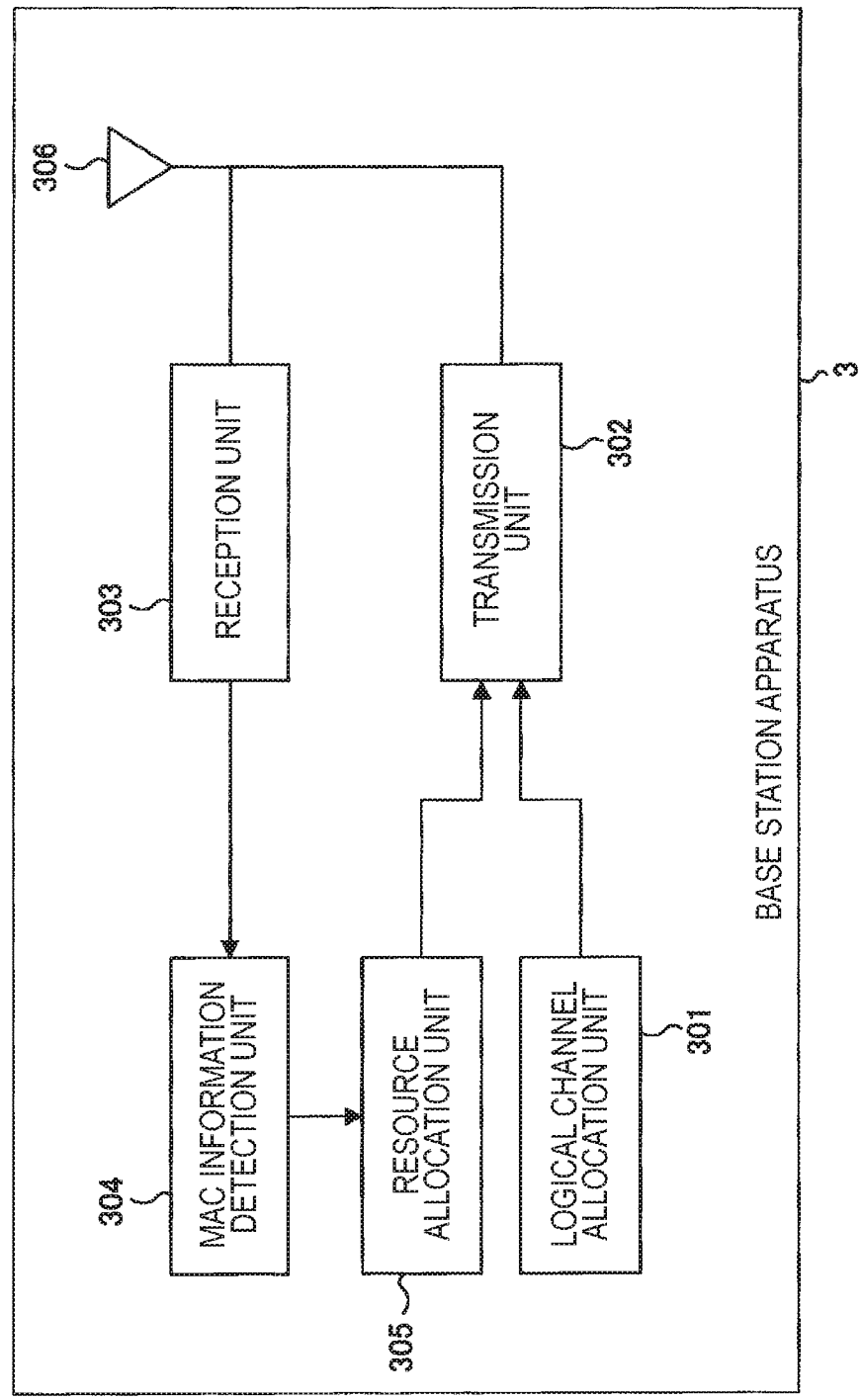
FIG. 18 is a schematic block diagram illustrating a constitution of a base station apparatus 3 according to the embodiment of the present invention.

FIG. 18 is a schematic block diagram illustrating a constitution of the base station apparatus 3 according to the present embodiment. As illustrated, the base station apparatus 3 is constituted to include a logical channel allocation unit 301, a transmission unit 302, a reception unit 303, a MAC information detection unit 304, a resource allocation unit 305, and a transmit and receive antenna unit 306. The logical channel allocation unit 301 allocates an identification information on the logical information to the terminal device 1. For example, in addition to an identifier of each logical channel, the priority level of each logical channel, the PBR, the BSD, and the like, which are described above, are included in the identification information of the logical channel.

The transmission unit 302 is constituted in such a manner as to transmit a data signal or a control signal to the terminal device 1 through the transmit and receive antenna unit 306. However, the transmission unit 302 is constituted in such a manner as to transmit the identification information on the logical channel that is allocated by the logical channel allocation unit 301. Furthermore, the transmission unit 302 is constituted in such a manner as to transmit each of the allocation information on the uplink resource and the allocation information on a D2D resource to the terminal device 1 at a prescribed timing. The uplink resource and the D2D resource are allocated by the resource allocation unit 305 to the terminal device 1.

The reception unit 303 is constituted in such a manner as to receive through the transmit and receive antenna unit 306 the data signal or the control signal that is transmitted from the terminal device 1.

The MAC information detection unit 304 detects the MAC PDU from the signal that is received in the reception unit 303, and, with a MAC subheader that is included in the MAC PDU, detects each MAC CE that includes information, such as the C-RNTI, the BSR, or the PH, from the MAC PDU.

The resource allocation unit 305 allocates the uplink resource to each terminal device 1, taking into consideration an amount of uplink buffer data for every terminal device 1 that is indicated by the BSR MAC CE which is detected in the MAC information detection unit 304. The resource allocation unit 305 allocates the D2D resource to each terminal device 1, taking into consideration an amount of D2D buffer data for every terminal device 1 that is indicated by the D2D BSR MAC CE. Pieces of information on the uplink resource and the D2D resource, which are allocated, are output to the transmission unit 302.

Figure 19:
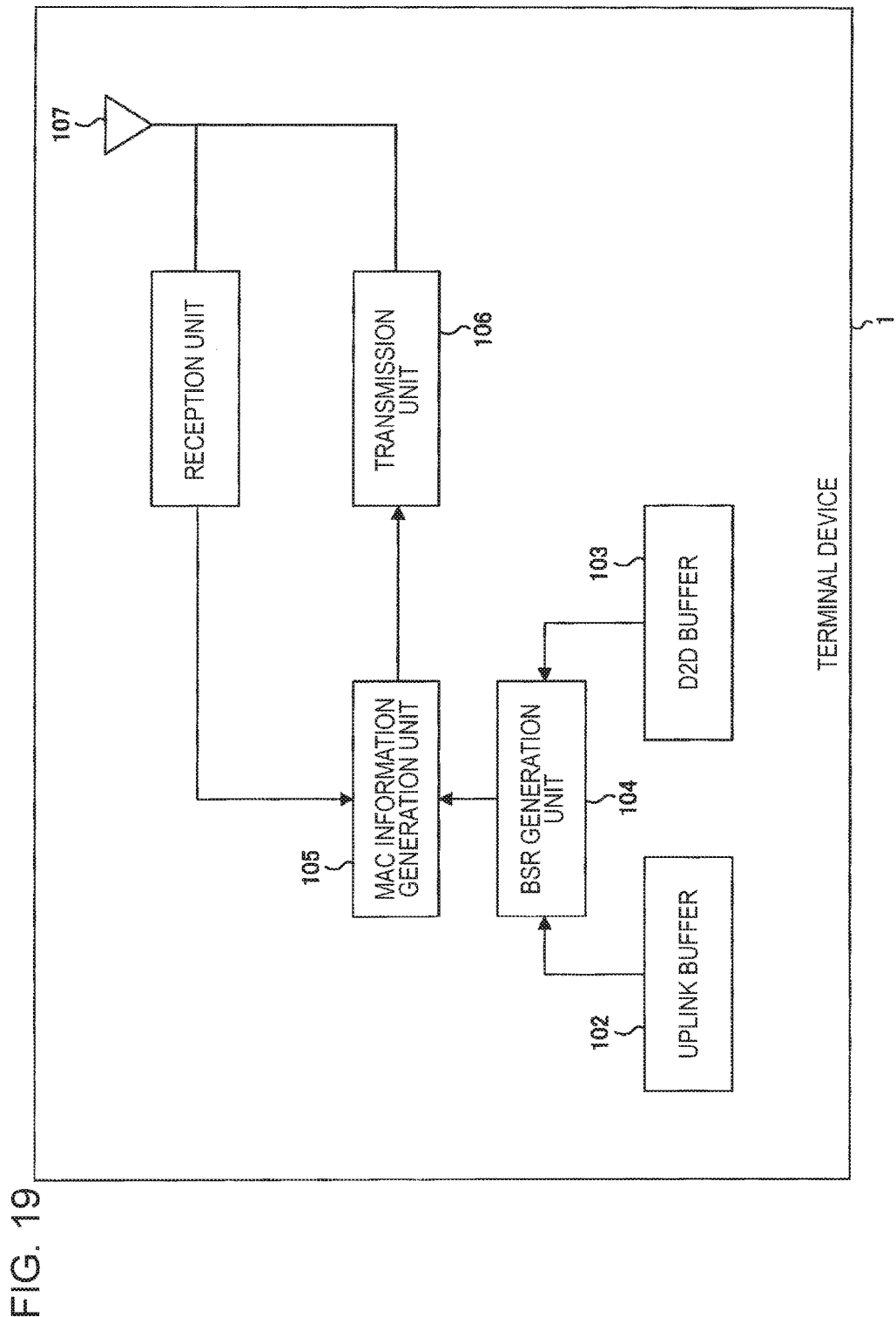
FIG. 19 is a schematic block diagram illustrating a constitution of a terminal device 1 according to the embodiment of the present invention.

FIG. 19 is a schematic block diagram illustrating a constitution of the terminal device 1 according to the present embodiment. As illustrated, the terminal device 1 is constituted to include a reception unit 101, an uplink buffer 102, a D2D buffer 103, a BSR generation unit 104, a MAC information generation unit 105, a transmission unit 106, and a transmit and receive antenna unit 107.

The reception unit 101 is constituted in such a manner as to receive through the transmit and receive antenna unit 107 the data signal or the control signal that is transmitted from the base station apparatus 3 or a different terminal device 1. Furthermore, the reception unit 101 receives the identification information on the logical channel and the allocation information on the uplink resource or the D2D resource, which are transmitted from the base station apparatus 3.

The uplink buffer 102 is constituted in such a manner as to temporarily retain uplink data until transmission of the uplink data to the base station apparatus 3 is completed in a case where the uplink data that is to be transmitted to the base station apparatus 3 occurs. The D2D buffer 103 is constituted in such a manner as to temporarily retain the D2D transmission data until the transmission of the D2D transmission data to the different terminal device 1 is completed in a case where the D2D transmission data that is to be transmitted to the different terminal device 1 occurs. However, the same storage region may be used in a shared manner in the uplink buffer 102 and the D2D buffer 103.

At a prescribed timing, the BSR generation unit 104 generates the uplink BSR for notifying an amount of uplink data for every LCG that is retained within the uplink buffer 102. At a prescribed timing, the BSR generation unit 104 generates the D2D BSR for notifying an amount of D2D transmission data for every LCG (or every logical channel) that is retained within the D2D buffer 103. The uplink BSR and the D2D BSR, which are generated, are output, as BSR information, to the MAC information generation unit 105.

The MAC information generation unit 105 is constituted in such a manner as to generate the MAC CE from information relating to the C-RNTI, or the BSR, or the PH and to generate the MAC PDU for notifying the base station apparatus 3 of the generated MAC CE with the transmission data included. At this point, the MAC information generation unit 105 generates the MAC PDU based on the LCP procedure described above based. Specifically, in a case where all of the MAC CEs and all pieces of transmission data are difficult to allocate for a size of the MAC PDU based on the allocated uplink resource, some of the MAC CEs and the pieces of transmission data are dropped based on the priority level of each of the MAC CEs and the pieces of transmission data.

The transmission unit 106 is constituted in such a manner as to transmit uplink data signal or control signal to the base station apparatus 3 through the transmit and receive antenna unit 107. The transmission unit 106 is constituted in such a manner as to transmit the D2D signal to the different terminal device 1 through the transmit and receive antenna unit 107.

It is apparent from above that the terminal device 1 according to the present embodiment may have various features as follows.

A terminal device 1 according to the present embodiment, which is a terminal device 1 that performs cellular communication (which is here referred to as first communication) with a base station apparatus 3 (which is here referred to as an E-UTRAN) and D2D communication (which is here referred to as second communication) between terminal devices 1, includes a transmission unit 106 that reports an uplink BSR (which is here referred to as a first Buffer Status Report) for the first communication and a D2D BSR (which is here referred to as a second Buffer Status Report) for the second communication, in uplink for the first communication, in which, in a logical channel prioritization procedure, a priority level of the first Buffer Status Report is higher than a priority level of the second Buffer Status Report.

Furthermore, according to the present embodiment, the transmission unit 106 of the terminal device 1 reports a power headroom report for the first communication in the uplink for the first communication, in which, in the logical channel prioritization procedure, the priority level of the second Buffer Status Report is higher than the priority level of the power headroom report.

Furthermore, according to the present embodiment, the logical channel prioritization procedure in the terminal device 1 is applied in a case where initial transmission is performed.

Furthermore, according to the present embodiment, the terminal device 1 allocates an uplink resource in order of lowering the priority level in the logical channel prioritization procedure.

Furthermore, according to the present embodiment, the first Buffer Status Report by the terminal device 1 is a regular Buffer Status Report (regular BSR) for the first communication or a periodic Buffer Status Report (periodic BSR) for the first communication, and the second Buffer Status Report is a regular Buffer Status Report for the second communication or a periodic Buffer Status Report for the second communication.

Furthermore, according to the present embodiment, the transmission unit 106 of the terminal device 1 reports a third Buffer Status Report (for example, which is the uplink BSR that uses a padding BSR) for the first communication and a fourth Buffer Status Report (for example, which is the D2D BSR that uses the padding BSR) for the second communication in the uplink for the first communication, in which, in the logical channel prioritization procedure, the priority level of the second Buffer Status Report is higher than priority levels of the third Buffer Status Report and the fourth Buffer Status Report.

Furthermore, according to the present embodiment, in the terminal device 1, in a case where the first Buffer Status Report and the third Buffer Status Report are triggered, at most one Buffer Status Report of the first Buffer Status Report and the third Buffer Status Report is included in one MAC PDU, and the first Buffer Status Report takes precedence over the third Buffer Status Report.

Furthermore, according to the present embodiment, the terminal device 1 may be constituted in such a manner that, in a case where the second Buffer Status Report and the fourth Buffer Status Report are triggered, at most one Buffer Status Report of the second Buffer Status Report and the fourth Buffer Status Report is included in one MAC PDU, and the second Buffer Status Report takes precedence over the fourth Buffer Status Report.

Furthermore, according to the present embodiment, in a case where the first Buffer Status Report, the second Buffer Status Report, the third Buffer Status Report, and the fourth Buffer Status Report are triggered and where the terminal device 1 is requested to transmit multiple MAC PDUs at a certain TTI, the terminal device 1 includes the third Buffer Status Report in any MAC PDU that does not include the first Buffer Status Report, and includes the fourth Buffer Status Report in any MAC PDU that does not include the second Buffer Status Report.

Furthermore, a terminal device 1 according to the present embodiment, which is a terminal device 1 that performs first communication with an E-UTRAN and second communication between terminal devices 1, includes a transmission unit 106 that transmits one or multiple MAC PDUs which includes a first Buffer Status Report MAC CE (for example, a BSR MAC CE) for the first communication and a second Buffer Status Report MAC CE (for example, a D2D BSR MAC CE) for the second communication, in uplink for the first communication, in which the first Buffer Status Report MAC CE and the second Buffer Status Report MAC CE include a buffer size field that corresponds to a logical channel group, the buffer size field indicates a total amount of available data over all logical channels in the corresponding logical channel group (LCG) after all MAC PDUs including the one or multiple MAC PDUs are built, a value of a buffer status field that is included in the first Buffer Status Report MAC CE is selected based on a buffer size reference (which is here referred to as a first table) associated with a value of a buffer size in a case where a first parameter (for example, extendedBSR-Sizes) is not configured, the value of the buffer status field that is included in the first Buffer Status Report MAC CE is selected based on an extended buffer size reference (which is here referred to as a second table) that is different from the first table associated with the value of the buffer size in a case where the first parameter is configured, and a third table that is used in a case where the value of the buffer status field that is included in the second Buffer Status Report MAC CE is selected does not depend on the first parameter.

Furthermore, according to the present embodiment, the third table that is used in the case where the value of the buffer status field that is included in the second Buffer Status Report MAC CE by the terminal device 1 is the same table as the first table.

Furthermore, according to the present embodiment, each of the first table and the second table that are used in the terminal device 1 indicates a correspondence between the value of the buffer size and an index, and an index in the second table indicates a value of an extended buffer size rather than a value of a buffer size to which an index in the first table corresponds.

Furthermore, according to the present embodiment, the number of bits of the buffer size field that is included in the second Buffer Status Report which is used in the terminal device 1 is smaller than the number of bits of the buffer size field that is included in the first Buffer Status Report.

Furthermore, a terminal device 1 according to the present embodiment, which is a terminal device 1 that performs first communication with an E-UTRAN and second communication between terminal devices 1, includes a configuration unit that configures a first mode (for example, mode 1) in which a resource for the second communication is controlled by the E-UTRAN, or a second mode (for example, mode 2) in which the resource for the second communication is selected by the terminal device 1 from a pool of resources, and a transmission unit that reports a Buffer Status Report for the second communication in uplink for the first communication, in which, in a case where the second mode is configured, the Buffer Status Report for the second communication is not triggered.

Furthermore, in the terminal device 1 according to the present embodiment, the Buffer Status Report for the second communication is triggered in a case where the first mode is configured.

Furthermore, in the terminal device 1 according to the present embodiment, the triggered Buffer Status Report for the second communication is cancelled in a case where the second mode is configured or reconfigured.

Furthermore, according to the present embodiment, the Buffer Status Report for the second communication by the terminal device 1 is a regular Buffer Status Report, and the regular Buffer Status Report for the second communication is triggered based on an event, such as when retxBSR-Timer expires and the terminal device 1 retains data available for transmission for the second communication.

Furthermore, in the terminal device 1 according to the present embodiment, a scheduling request is triggered at least based on a condition that the Buffer Status Report for the second communication is triggered and is not cancelled, and the scheduling request is used for requesting a UL-SCH resource for initial transmission in the uplink for the first communication.

Furthermore, the terminal device 1 according to the present embodiment cancels the pending scheduling request that derives from the regular Buffer Status Report for the second communication that is based on the event, in the case where the second mode is configured or reconfigured.

Furthermore, an integrated circuit according to the present embodiment, which is an integrated circuit that is built into a terminal device 1 which performs first communication with an E-UTRAN and second communication between terminal devices 1, causes the terminal device 1 to perform a sequence of functions that includes a function of reporting a first Buffer Status Report for the first communication and a second Buffer Status Report for the second communication, in uplink for the first communication, in which, in a logical channel prioritization procedure, a priority level of the first Buffer Status Report is higher than a priority level of the second Buffer Status Report.

Furthermore, an integrated circuit according to the present embodiment, which is an integrated circuit that is built into a terminal device 1 which performs first communication with an E-UTRAN and second communication between terminal devices 1, causes the terminal device 1 to perform a sequence of functions that includes a function of transmitting one or multiple MAC PDUs which includes a first Buffer Status Report MAC CE for the first communication and a second Buffer Status Report MAC CE for the second communication, in uplink for the first communication, in which the first Buffer Status Report MAC CE and the second Buffer Status Report MAC CE include a buffer size field that corresponds to a logical channel group, the buffer size field indicates a total amount of available data over all logical channels in the corresponding logical channel group after all MAC PDUs including the one or multiple MAC PDUs are built, a value of a buffer status field that is included in the first Buffer Status Report MAC CE is selected based on a first table associated with a value of a buffer size in a case where a first parameter is not configured, the value of the buffer status field that is included in the first Buffer Status Report MAC CE is selected based on a second table that is different from the first table associated with the value of the buffer size in a case where the first parameter is configured, and a third table that is used in a case where the value of the buffer status field that is included in the second Buffer Status Report MAC CE is selected does not depend on the first parameter.

Furthermore, an integrated circuit according to the present invention, which is an integrated circuit that is built into a terminal device 1 which performs first communication with an E-UTRAN and second communication between terminal devices 1, causes the terminal device 1 to perform a sequence of functions that includes a function of configuring a first mode in which a resource for the second communication is controlled by the E-UTRAN, or a second mode in which the resource for the second communication is selected by the terminal device 1 from the pool of resources, and a function of reporting a Buffer Status Report for the second communication in uplink for the first communication, in which, in a case where the second mode is configured, the Buffer Status Report for the second communication is not triggered.

Furthermore, a wireless communication method according to the present embodiment, which a wireless communication method that is used in a terminal device 1 which performs first communication with an E-UTRAN and second communication between terminal devices 1, includes reporting a first Buffer Status Report for the first communication and a second Buffer Status Report for the second communication, in uplink for the first communication, in which, in a logical channel prioritization procedure, a priority level of the first Buffer Status Report is higher than a priority level of the second Buffer Status Report.

Furthermore, a wireless communication method according to the present embodiment, which is a wireless communication method that is used in a terminal device 1 which performs first communication with an E-UTRAN and second communication between terminal devices 1, includes transmitting one or multiple MAC PDUs which includes a first Buffer Status Report MAC CE for the first communication and a second Buffer Status Report MAC CE for the second communication, in uplink for the first communication, in which the first Buffer Status Report MAC CE and the second Buffer Status Report MAC CE include a buffer size field that corresponds to a logical channel group, the buffer size field indicates a total amount of available data over all logical channels in the corresponding logical channel group after all MAC PDUs including the one or multiple MAC PDUs are built, a value of a buffer status field that is included in the first Buffer Status Report MAC CE is selected based on a first table associated with a value of a buffer size in a case where a first parameter is not configured, the value of the buffer status field that is included in the first Buffer Status Report MAC CE is selected based on a second table that is different from the first table associated with the value of the buffer size in a case where the first parameter is configured, and a third table that is used in a case where the value of the buffer status field that is included in the second Buffer Status Report MAC CE is selected does not depend on the first parameter.

Furthermore, a wireless communication method according to the present embodiment, which is a wireless communication method that is used in a terminal device 1 which performs first communication with an E-UTRAN and second communication between terminal devices 1, includes configuring a first mode in which a resource for the second communication is controlled by the E-UTRAN, or a second mode in which the resource for the second communication is selected by the terminal device 1 from the pool of resources, and reporting a Buffer Status Report for the second communication in uplink for the first communication, in which, in a case where the second mode is configured, the Buffer Status Report for the second communication is not triggered.

A program running on the base station apparatus 3 and the terminal device 1 according to the present invention may be a program (a program for causing a computer to operate) that controls a Central Processing Unit (CPU) and the like in such a manner as to realize the function according to the embodiments of the present invention, which are described above. Then, pieces of information that are handled in the device and the apparatus are temporarily stored in a Random Access Memory (RAM) while being processed. Thereafter, the pieces of information are stored in various types of ROMs such as a Flash Read Only Memory (ROM), or a Hard Disk Drive (HDD) and, if need arises, are read by the CPU to be modified or rewritten.

Moreover, one portion of each of the terminal device 1 and the base station apparatus 3 according to the embodiments, which are described above, may be realized by the computer. In such a case, this one portion may be realized by recording a program for realizing such a control function on a computer-readable medium and causing a computer system to read the program stored on the recording medium for execution.

Moreover, the "computer system" here is defined as a computer system that is built into the terminal device 1 or the base station apparatus 3 and as including an OS or hardware components such as a peripheral device. Furthermore, the "computer-readable recording medium" refers to a portable medium, such as a flexible disk, a magneto-optical disk, a ROM, and a CD-ROM, and a storage device, such as a hard disk, that is built into the computer system.

Moreover, the "computer-readable recording media" may include a medium that dynamically retains the program for a short period of time, such as a communication line that is available when transmitting the program over a network such as the Internet or over a communication network such as a telephone network, and a medium that retains the program for a fixed period of time, such as a volatile memory within the computer system, which functions as a server or a client in a case where the program is retained dynamically for a short period of time. Furthermore, the program described above may be one for realizing some of the functions described above and additionally may be one that can realize the functions described above in combination with a program that is already recorded on the computer system.

Furthermore, the base station apparatus 3 according to the embodiment, which is described above, can be realized as an aggregation (an apparatus group) that is constituted from multiple apparatuses. Each of the apparatuses that constitute the apparatus group may be equipped with some portions or all portions of each function of, or some portions or all portions of each functional block of the base station apparatus 3 according to the embodiment, which is described. The apparatus group itself may have each general function of or each general functional block of the base station apparatus 3. Furthermore, the terminal device 1 according to the embodiment, which is described above, is also capable of communicating with the base station apparatus as an aggregation.

Furthermore, the base station apparatus 3 according to the embodiment, which is described above, may also be referred to as an Evolved Universal Terrestrial Radio Access Network (E UTRAN). Furthermore, the base station apparatus 3 according to the embodiment, which is described above, may have some portions or all portions of a function of a node that is at a higher level than an eNodeB.

Furthermore, some portions or all portions of each of the terminal device 1 and the base station apparatus 3 according to the embodiment, which is described above, may be realized as an LSI that is a typical integrated circuit and may be realized as a chip set. Each functional block of the terminal device 1 and the base station apparatus 3 may be individually realized into a chip, and some or all of the functional blocks may be integrated into a chip. Furthermore, a circuit integration technique is not limited to the LSI, and an integrated circuit for the functional block may be realized as a dedicated circuit or a general-purpose processor. Furthermore, if with advances in semiconductor technology, a circuit integration technology for a circuit with which an LSI is replaced will appear, it is possible that an integrated circuit to which such a technology is applied is also used.

Furthermore, according to the embodiments, which are described above, the terminal device is described as one example of a communication device, but the present invention is not limited to this, and can also be applied to a terminal device or a communication apparatus, such as a fixed-type electronic apparatus that is installed indoors or outdoors, or a stationary-type electronic apparatus, for example, an AV apparatus, a kitchen apparatus, a cleaning or washing machine, an air conditioner, office equipment, a vending machine, and other household apparatuses.

The embodiment of the invention is described in detail above referring to the drawings, but the specific configuration is not limited to the embodiment and also includes an amendment to a design and the like that fall within the scope that does not depart from the gist of the present invention. Furthermore, various modifications are possible within the scope of the present invention defined by claims, and embodiments that are implemented by suitably combining technical means that are disclosed according to different embodiments also falls within the technical scope of the present invention. Furthermore, a configuration in which a constituent element that achieves the same effect is substituted for the one that is described above according to each of the embodiments described above also falls within the technical scope of the present invention.

INDUSTRIAL APPLICABILITY

The present invention can be applied to a communication device, such as a portable telephone, a home electronic appliance, such as an AV system, and other electronic apparatus.

DESCRIPTION OF REFERENCE NUMERALS 1 (1A, 1B, 1C) TERMINAL DEVICE
2 REPEATER
3 BASE STATION APPARATUS
101 RECEPTION UNIT
102 UPLINK BUFFER
103 D2D BUFFER
104 BSR GENERATION UNIT
105 MAC INFORMATION GENERATION UNIT
106 TRANSMISSION UNIT
107 TRANSMIT AND RECEIVE ANTENNA
301 LOGICAL CHANNEL ALLOCATION UNIT
302 TRANSMISSION UNIT
303 RECEPTION UNIT
304 MAC INFORMATION DETECTION UNIT
305 RESOURCE ALLOCATION UNIT
306 TRANSMIT AND RECEIVE ANTENNA

The invention claimed is:

1. A terminal device configured to communicate with a base station apparatus through uplink, the terminal device comprising:
information generation circuitry configured to
perform a logical channel prioritization procedure for the uplink in a case that new transmission is performed, and
for the logical channel prioritization procedure, take into account priorities of a plurality of MAC control elements; and
transmission circuitry configured to perform the new transmission based on a result of the logical channel prioritization procedure,
wherein the plurality of MAC control elements includes a first MAC control element and a second MAC control element,
the first MAC control element is used to provide the base station apparatus with information on an amount of first data available for transmission in a first buffer for the uplink,
the second MAC control element is used to provide the base station apparatus with information on an amount of second data available for transmission in a second buffer for a first link that is used for direct communication between the terminal device and another terminal device, and
for the logical channel prioritization procedure, except in a case that the first MAC control element is included for padding, the first MAC control element is higher in priority than the second MAC control element.

2. The terminal device according to claim 1, wherein the second MAC control element is higher in priority than the first MAC control element that is included for the padding, except in a case that the second MAC control element is included for the padding.

3. The terminal device according to claim 1, wherein the second MAC control element that is included for the padding is lower n priority than the first MAC control element.

4. The terminal device according to claim 1, wherein the plurality of MAC control elements includes a third MAC control element that is used to provide the base station apparatus with a power headroom report, and the third MAC control element is higher in priority than the second MAC control element.

5. The terminal device according to claim 4, wherein the first MAC control element is higher priority than the third MAC control element, except in a case that the first MAC control element is included for the padding.

6. An integrated circuit mountable on a terminal device configured to communicate with a base station apparatus through uplink, the integrated circuit causing the terminal device to perform at least functions of:
performing a logical channel prioritization procedure for the uplink in a case that new transmission is performed, and
for the logical channel prioritization procedure, taking into account priorities of a plurality of MAC control elements; and
performing the new transmission based on a result of the logical channel prioritization procedure,
wherein the plurality of MAC control elements includes a first MAC control element and a second MAC control element,
the first MAC control element is used to provide the base station apparatus with information on an amount of first data available for transmission in a first buffer for the uplink,
the second MAC control element is used to provide the base station apparatus with information on an amount of second data available for transmission in a second buffer for a first link that is used for direct communication between the terminal device and another terminal device, and
for the logical channel prioritization procedure, except in a case that the first MAC control element is included for padding, the first MAC control element is higher in priority than the second MAC control element.

7. The integrated circuit according to claim 6, wherein the second MAC control element is higher in priority than the first MAC control element that is included for the padding, except in a case that the second MAC control element is included for the padding.

8. The integrated circuit according to claim 6, wherein the second MAC control element that is included for the padding is lower in priority than the first MAC control element.

9. The integrated circuit according to claim 6, wherein the plurality of MAC control elements includes a third MAC control element that is used to provide the base station apparatus with a power headroom report, and the third MAC control element is higher in priority than the second MAC control element.

10. The integrated circuit according to claim 9, wherein the first MAC control element is higher in priority than the third MAC control element, except in a case that the first MAC control element is included for the padding.

11. A wireless communication method for a terminal device configured to communicate with a base station apparatus through uplink, the wireless communication method comprising:
performing a logical channel prioritization procedure for the uplink in a case that new transmission is performed; and for the logical channel prioritization procedure, taking into account priorities of a plurality of MAC control elements; and performing the new transmission based on a result of the logical channel prioritization procedure, wherein the plurality of MAC control elements includes a first MAC control element and a second MAC control element, the first MAC control element is used to provide the base station apparatus with information on an amount of first data available for transmission in a first buffer for the uplink, the second MAC control element is used to provide the base station apparatus with information on an amount of second data available for transmission in a second buffer for a first link that is used for direct communication between the terminal device and another terminal device, and for the logical channel prioritization procedure, except in a case that the first MAC control element is included for padding, the first MAC control element is higher in priority than the second MAC control element.

12. The wireless communication method according to claim 11, wherein the second MAC control element is higher in priority than the first MAC control element that is included for the padding, except in a case that the second MAC control element is included for the padding.

13. The wireless communication method according to claim 11, wherein the second MAC control element that is included for the padding is lower in priority than the first MAC control element.

14. The wireless communication method according to claim 11, wherein the plurality of MAC control elements includes a third MAC control element that is used to provide the base station apparatus with a power headroom report, and the third MAC control element is higher in priority than the second MAC control element.

15. The wireless communication method according to claim 14, wherein the first MAC control element is higher in priority than the third MAC control element, except in a case that the first MAC control element is included for the padding.

* * * * *